(12) United States Patent
Shahar et al.

(10) Patent No.: US 9,927,539 B2
(45) Date of Patent: Mar. 27, 2018

(54) SYSTEMS AND METHODS FOR IMPROVING IMAGING BY SUB-PIXEL CALIBRATION

(71) Applicant: General Electric Company, Schenectady, NY (US)

(72) Inventors: Arie Shahar, Moshav Magshimim (IL); Mark David Fries, Waukesha, WI (US); Yaron Glazer, Rehovot (IL); Avishai Ofan, Rehovot (IL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/613,998

(22) Filed: Jun. 5, 2017

(65) Prior Publication Data
US 2017/0269240 A1 Sep. 21, 2017

Related U.S. Application Data

(63) Continuation-in-part of application No. 14/627,436, filed on Feb. 20, 2015, now Pat. No. 9,696,440.

(51) Int. Cl.
*H01L 27/146* (2006.01)
*G01T 7/00* (2006.01)
(Continued)

(52) U.S. Cl.
CPC .............. *G01T 7/005* (2013.01); *G01T 1/249* (2013.01); *G01T 1/2928* (2013.01)

(58) Field of Classification Search
CPC .... G01T 1/2928; H04N 3/155; H04N 3/1568; H04N 3/1593
See application file for complete search history.

(56) References Cited

U.S. PATENT DOCUMENTS 6,169,287 B1   1/2001 Warburton
8,466,420 B2 *  6/2013 Wangerin ............... G01T 1/2928
                                                250/363.03
(Continued)

OTHER PUBLICATIONS

Warburton, "An Approach to Sub-pixel Spatial Resolution in Room Temperature X-Ray Detector Arrays with Good Energy Resolution", Mat. Res. Symp Proc. 487, 531-535, 1988. Mountain View, CA, USA, (5 pages).

(Continued)

*Primary Examiner* — Kenneth J Malkowski
(74) *Attorney, Agent, or Firm* — Dean D. Small; The Small Patent Law Group, LLC

(57) ABSTRACT

A radiation detector assembly is provided that includes a semiconductor detector having a surface, plural pixelated anodes, and at least one processor. The pixelated anodes are disposed on the surface. Each pixelated anode is configured to generate a primary signal responsive to reception of a photon by the pixelated anode and to generate at least one secondary signal responsive to an induced charge caused by reception of a photon by at least one adjacent anode. The at least one processor is operably coupled to the pixelated anodes. The at least one processor configured to define sub-pixels for each pixelated anode; acquire signals corresponding to acquisition events from the pixelated anodes; determine sub-pixel locations for the acquisition events using the signals; and apply at least one calibration parameter on a per sub-pixel basis for the acquisition events based on the determined sub-pixel locations.

20 Claims, 12 Drawing Sheets

(51) Int. Cl.
*G01T 1/24* (2006.01)
*G01T 1/29* (2006.01)

(56) References Cited

U.S. PATENT DOCUMENTS

| | | | |
|---|---|---|---|
| 2011/0082659 A1* | 4/2011 | Montemont | G01T 1/2928 702/85 |
| 2011/0155918 A1 | 6/2011 | Bouhnik et al. | |
| 2013/0193337 A1* | 8/2013 | Bouhnik | G01T 1/249 250/370.14 |

OTHER PUBLICATIONS

Zhu, "Digital Signal Processing Methods for Pixelated 3-D Position Sensitive Room-Temperature Semiconductor Detectors", a dissertation, 2012, p. 1-184, https://deepblue.lib.umich.edu/handle/2027.42/91490 (203 pages).

* cited by examiner

SYSTEMS AND METHODS FOR IMPROVING IMAGING BY SUB-PIXEL CALIBRATION

RELATED APPLICATIONS

The present application is a continuation-in-part of, and claims priority to U.S. patent application Ser. No. 14/627,436, entitled "Systems and Methods for Improving Energy Resolution By Sub-Pixel Energy Calibration," filed Feb. 20, 2015, the subject matter of which is incorporated herein in its entirety.

BACKGROUND

The subject matter disclosed herein relates generally to medical imaging systems, and more particularly to calibration of radiation detection systems.

In nuclear medicine (NM) imaging, such as single photon emission computed tomography (SPECT) or positron emission tomography (PET) imaging, radiopharmaceuticals are administered internally to a patient. Detectors (e.g., gamma cameras), typically installed on a gantry, capture the radiation emitted by the radiopharmaceuticals and this information is used, by a computer, to form images. The NM images primarily show physiological function of, for example, the patient or a portion of the patient being imaged. Detectors, however, may be subject to inhomogeneity issues, in that the energy detected for a given event (e.g., photon impact) may vary with location of impact. Such variation in detected energy causes degradation, for example, in energy resolution and gain stability. Further still, for example, inhomogeneity issues may affect sensitivity of different portions of individual pixels.

BRIEF DESCRIPTION

In accordance with an embodiment, a radiation detector assembly is provided that includes a semiconductor detector having a surface, plural pixelated anodes, and at least one processor. The pixelated anodes are disposed on the surface. Each pixelated anode is configured to generate a primary signal responsive to reception of a photon by the pixelated anode and to generate at least one secondary signal responsive to an induced charge caused by reception of a photon by at least one adjacent anode. The at least one processor is operably coupled to the pixelated anodes. The at least one processor is configured to define sub-pixels for each pixelated anode; acquire signals corresponding to acquisition events from the pixelated anodes; determine sub-pixel locations for the acquisition events using the signals; and apply at least one calibration parameter on a per sub-pixel basis for the acquisition events based on the determined sub-pixel locations.

In accordance with another embodiment, a method is provided (e.g., a method of imaging using a semiconductor detector having a surface with plural pixelated anodes disposed thereon, with each pixelated anode configured to generate signals responsive to reception of a photon by the pixelated anode. The method includes defining, with at least one processor operably coupled to the pixelated anodes, sub-pixels for each pixelated anode. The method also includes acquiring, with the at least one processor, signals corresponding to acquisition events from the pixelated anodes. Further, the method includes determining, with the at least one processor, sub-pixel locations for the acquisition events using the signals. Also, the method includes applying, with the at least one processor, at least one calibration parameter on a per-sub-pixel bases for the acquisition events based on the determined sub-pixel.

In accordance with another embodiment, method includes providing a semiconductor detector having a surface with plural pixelated anodes disposed thereon, with each pixelated anode configured to generate signals responsive to reception of a photon by the pixelated anode. Also, the method includes operably coupling the pixelated anodes to at least one processor, and defining, with the at least one processor, sub-pixels for each pixelated anode. The method also includes providing a calibrated radiation supply to the semiconductor detector. The pixelated anodes generate signals responsive to the calibrated radiation supply. Further, the method includes acquiring, with the at least one processor, the signals from the pixelated anodes, and determining sub-pixel locations for calibration acquisition events using the signals generated responsive to the calibrated radiation supply. The method also includes determining a non-calibrated value for each sub-pixel. Also, the method includes determining at least one calibration parameter to adjust the non-calibrated value for each sub-pixel to a desired value, and applying the at least one determined calibration parameter to the non-calibrated value for each sub-pixel to generate a calibrated value for each sub-pixel.

DETAILED DESCRIPTION

Figure 1:
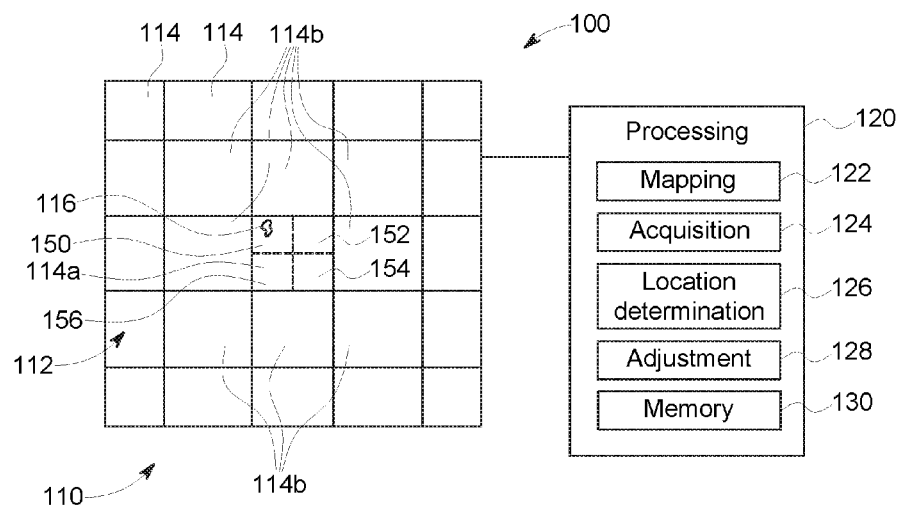
FIG. 1 provides a schematic view of a radiation detector assembly according to an embodiment.

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for improving energy resolution and gain stability of detectors by correcting inhomogeneous charge collection over detector area (e.g., pixel area). For example, in various embodiments, virtual sub-pixels are defined for each pixel, and individual energy spectra for each sub-pixel are generated. The individual energy spectra are adjusted or corrected, before combining, using one or more calibration parameters (e.g., correction or adjustment parameters determined during a calibration procedure using a radiation source (or sources) having a known energy distribution) based on sub-pixel location. After the individual sub-pixel energy spectra for a given pixel are corrected, the corrected sub-pixel energy spectra for the pixel are combined to provide a summed energy spectrum for the entire pixel.

A technical effect of at least one embodiment includes improved image quality (e.g., due to correcting or addressing inhomogeneity of collected charges in a detector generated responsive to radiation impacting the detector). A technical effect of at least one embodiment includes improved energy resolution. A technical effect of at least one embodiment includes improved gain stability. A technical effect of at least one embodiment includes reduced production costs, for example due to improved production yield (e.g., detectors which may not initially meet a predetermined specification may be calibrated pursuant to various embodiments discussed herein to satisfy the predetermined specification after calibration).

FIG. 1 provides a schematic view of a radiation detector assembly 100 in accordance with various embodiments. As seen in FIG. 1, the radiation detector assembly 100 includes a semiconductor detector 110 and a processing unit 120. The semiconductor detector 110 has a surface 112 on which plural pixelated anodes 114 are disposed. In various embodiments a cathode (not shown in FIG. 1) may be disposed on a surface opposite the surface 112 on which the pixelated anodes 114 are disposed. For example, a single cathode may be deposited on one surface with the pixelated anodes disposed on an opposite surface. Generally, when radiation (e.g., one or more photons) impacts the pixelated anodes 114, the semiconductor detector 110 generates electrical signal corresponding to the radiation penetrating via the surface 112 and being absorbed in the volume of detector 110 under surface 112. In the illustrated embodiment, the pixelated anodes 114 are shown in a 5×5 array for a total of 25 pixelated anodes 114; however, it may be noted that other numbers or arrangements of pixelated anodes may be used in various embodiments. Each pixelated anode 114, for example, may have a surface area of 2.5 millimeters square; however, other sizes and/or shapes may be employed in various embodiments.

The semiconductor detector 110 in various embodiments may be constructed using different materials, such as semiconductor materials, including Cadmium Zinc Telluride (CdZnTe), often referred to as CZT, Cadmium Telluride (CdTe), and Silicon (Si), among others. The detector 110 may be configured for use with, for example, nuclear medicine (NM) imaging systems, positron emission tomography (PET) imaging systems, and/or single photon emission computed tomography (SPECT) imaging systems.

In the illustrated embodiment, each pixelated anode 114 generates different signals depending on the location of where a photon is absorbed in the volume of detector 110 under the surface 112. For example, each pixelated anode 114 generates a primary signal responsive to the absorption of a photon in the volume of detector 110 under the particular pixelated anode 114 through which the photon penetrates into the detector volume. The volumes of detector 110 under pixelated anodes 114 are defined as voxels (not shown). For each pixelated anode 114, detector 110 has the corresponding voxel. The absorption of a photon by a certain voxel corresponding to a particular pixelated anode 114a also results in an induced charge that may be detected by pixels 114b adjacent to or surrounding the particular pixelated anode 114a that receives the photon. A primary signal may include information regarding photon energy (e.g., a distribution across a range of energy levels) as well as location information corresponding to the particular pixelated anode 114 at which a photon penetrates via the surface 112 and is absorbed in the corresponding voxel.

For example, in FIG. 1, a photon 116 is shown impacting the pixelated anode 114a to be absorbed in the corresponding voxel. Accordingly, the pixelated anode 114a generates a primary signal responsive to reception of the photon 116. As also seen in FIG. 1, pixelated anodes 114b are adjacent to the pixelated anode 114a. Pixelated anode 114a has 9 adjacent pixelated anodes 114b. When the pixelated anode 114a is impacted by the photon 116, a charge is induced in and collected by the pixelated anode 114a to produce the primary signal. One or more of the adjacent pixelated anodes 114b generates a secondary signal responsive to the induced charge generated in and collected by the pixelated anode 114a, which produces the primary signal. The secondary signal has an amplitude that is smaller than the primary signal. For any given photon, the corresponding primary signal (from the impacted pixel) and secondary signals (from one or more pixels adjacent to the impacted pixel) may be used to locate the reception point of a photon at a particular location within the pixel (e.g., to identify a particular sub-pixel location within the pixel).

Each pixelated anode 114 may have associated therewith one or more electronics channels configured to provide the primary and secondary signals to one or more aspects of the processing unit 120 in cooperation with the pixelated anodes. In some embodiments, all or a portion of each electronics channel may be disposed on the detector 110. Alternatively or additionally, all or a portion of each electronics channel may be housed externally to the detector 110, for example as part of the processing unit 120, which may be or include an Application Specific Integration Circuit (ASIC). The electronics channels may be configured to provide the primary and secondary signals to one or more aspects of the processing unit 120 while discarding other signals. For example, in some embodiments, each electronics channel includes a threshold discriminator. The threshold discriminator may allow signals exceeding a threshold level to be transmitted while preventing or inhibiting transmission of signals that do not exceed a threshold level. Generally, the threshold level is set low enough to reliably capture the secondary signals, while still being set high enough to exclude lower strength signals, for example due to noise. It may be noted that, because the secondary signals may be relatively low in strength, the electronics utilized are preferably low noise electronics to reduce or eliminate noise that is not eliminated by the threshold level. In some embodiments, each electronic channel includes a peak-and-hold unit to store electrical signal energy, and may also include a readout mechanism. For example, the electronic channel may include a request-acknowledge mechanism that allows the peak-and-hold energy and pixel location for each channel to be read out individually. Further, in some embodiments, the processing unit 120 or other processor may control the signal threshold level and the request-acknowledge mechanism.

In the illustrated embodiment, the processing unit 120 is configured to define sub-pixels for each pixelated anode. It may be noted that the sub-pixels in the illustrated embodiment (depicted as separated by dashed lines) are not physically separate, but instead are virtual entities defined by the processing unit 120. Generally, the use of increasing numbers of sub-pixels per pixel improves resolution while also increasing computational or processing requirements. The particular number of sub-pixels defined or employed in a given application may be selected based on a balance between improved resolution against increased processing requirements. In various embodiments, the use of virtual sub-pixels as discussed herein provides improved resolution while avoiding or reducing costs associated with increasingly larger number of increasingly smaller pixelated anodes.

In the illustrated embodiment, the pixelated anode 114a is shown as divided into four sub-pixels, namely sub-pixel 150, sub-pixel 152, sub-pixel 154, and sub-pixel 156. While sub-pixels are shown in FIG. 1 for only pixelated anode 114a for clarity and ease of illustration, it may be noted that the processing unit 120 in the illustrated embodiment also defines corresponding sub-pixels for each of the remaining pixelated anodes 114. As seen in FIG. 1, the photon 116 is impacting a portion of the pixelated anode 114a defined by the virtual sub-pixel 150.

In the illustrated embodiment, the processing unit 120 acquires the primary signal for a given acquisition event (e.g., impact of a photon) from the pixelated anode 114a, along with timing (e.g., timestamp) information corresponding to a time of generation of the primary signal and location information identifying the pixelated anode 114a as the pixelated anode corresponding to the primary signal. For example, an acquisition event such as a photon impacting a pixelated anode 114 may result in a number of counts occurring across a range or spectrum of energies, with the primary signal including information describing the distribution of counts across the range or spectrum of energies. The processing unit 120 also acquires one or more secondary signals for the acquisition event from the pixelated anodes 114b, along with timestamp information and location information for the secondary signal(s). The processing unit 120 then determines the location for the given acquisition event identifying the pixelated anode 114a as the impacted pixelated anode 114a, and then determining which of sub-pixels 150, 152, 154, 156 define the location of impact for the acquisition event. Using conventional methods, the location of sub-pixels 150, 152, 154, 156 may be derived based on the location (e.g., associated pixelated anode) and the relationships between the strengths of the primary signal in the associated pixelated anode 114a and the secondary signal(s) in the adjacent pixelated anodes 114b for the acquisition event. The processing unit 120 may use time stamp information as well as location information to associate the primary signal and secondary signals generated responsive to the given acquisition event with each other, and to discriminate the primary signal and secondary signals for the given acquisition event from signals for other acquisition events occurring during a collection or acquisition period using the time stamp and location information. Accordingly, the use of time stamp information helps allow for distinguishing between the primary signal and its corresponding secondary signals from random coincidence that may occur between primary signals of adjacent pixels, since the timestamps from the primary signal and its corresponding secondary signals are correlated for a particular acquisition event.

Figure 2:
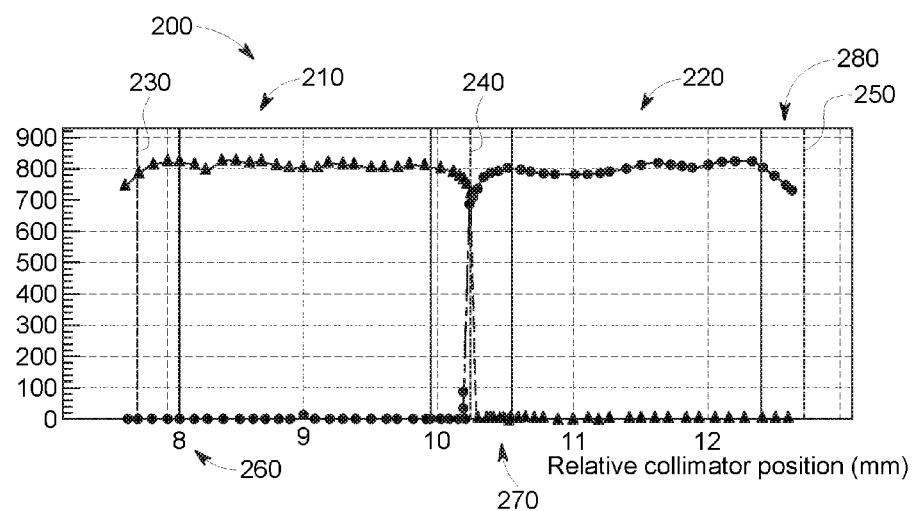
FIG. 2 illustrates an example of non-uniformity of signal over different pixels.

It may be noted that, generally, semiconductor detector surfaces are not homogenous or uniform in that the energy detected for a photon may vary as a function of location of impact. For example, a photon that will result in a first measured energy spectrum (e.g., distribution of counts at different energy levels) when impacting at a first location will result in a different second measured energy spectrum when impacting at a second location elsewhere on the detector surface. An example of non-uniformity of signal over different pixels is shown in FIG. 2. In FIG. 2, a graph 200 depicts peak position (the energy level having the most recorded counts for an acquisition event) versus position of impact on a detector or corresponding collimator.

The example of FIG. 2 depicts peak positions of energy spectrum as a function of scan position of a 300 µm radiation spot moving across two pixels (a first pixel 210 and a second pixel 220). For clarity of illustration, the energy levels in FIG. 2 are displayed in arbitrary units. In various embodiments, eV or keV may be utilized to describe energy levels. Lines 230 and 240 depict the boundaries of the first pixel 210, while lines 240 and 250 depict the boundaries of the second pixel 220. Charge sharing zones 260 (between the first pixel 210 and an adjacent pixel not represented in FIG. 2), 270 (between the first pixel 210 and the second pixel 220), and 280 (between the second pixel 220 and an adjacent pixel not represented in FIG. 2) are also shown in FIG. 2. As seen in FIG. 2, the peak position varies as a function of detector or collimator position, with the greatest variances in the charge sharing zones.

Figure 3:
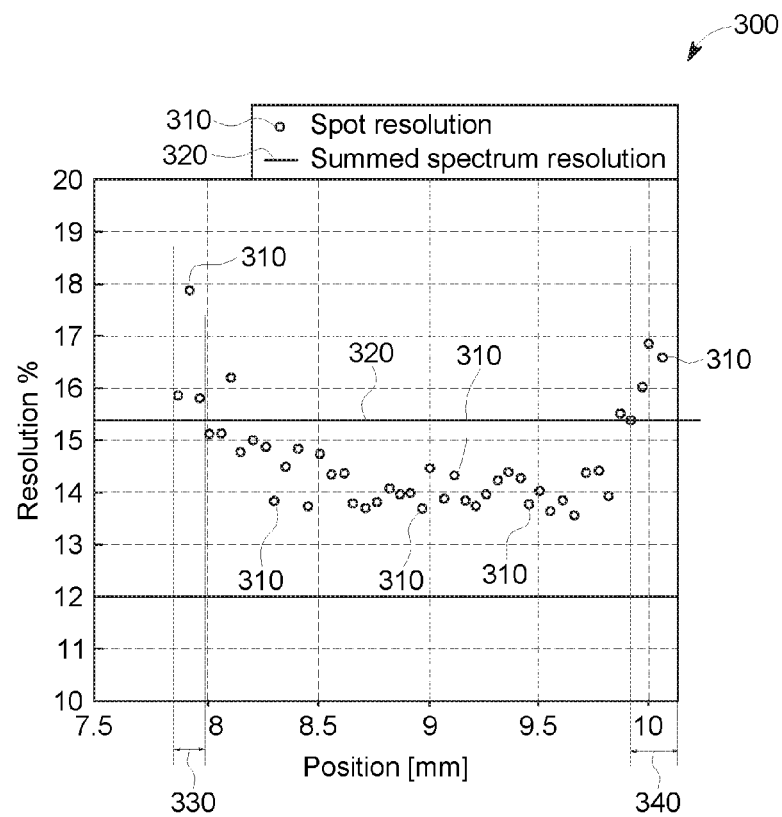
FIG. 3 shows an example of energy-resolution degradation due to peak-shift (or shift of energy level having the highest count for an acquisition event varying depending upon impact location).

FIG. 3 illustrates an example of energy-resolution degradation due to peak-shift (or shift of energy level having the highest count for an acquisition event varying depending upon impact location). In FIG. 3, a graph 300 plots energy-resolution percentage as a function of the position of a radiation spot impinging on the pixel, such as pixel 114 in FIG. 1. Points 310 depict energy-resolution for energy spectra, when each spectrum of these spectra includes energy distribution of multiple events acquired at a certain position of the radiation spot on the detector. The different spots 310 indicate the energy resolution of the various energy spectra corresponding to acquisitions of groups of events when each group of events is related to a different spectrum and is acquired in a different position of the radiation spot along the surface of a pixel, such as pixel 114 of FIG. 1. Line 320 depicts an energy resolution of the summed (combined) spectrum representing the energy-resolution of the energy spectrum of all the events (all the group of events) acquired from all the positions of the radiation spot all over the area of a pixel, such as pixel 114 in FIG. 1, or a resolution for a spectrum of the entire pixel, which is the summed spectrum of all the spectra of points 310 included in the pixel. As seen in FIG. 3, the individual resolutions for the points 310 are generally better than the resolution for the summed spectral resolution depicted by line 320, except in or near the charge sharing zones 330 and 340. The variation in peak position of the points 310 results in spectral broadening (e.g., a summed spectrum of multiple spectra for plural acquisitions of groups of events acquired in different positions across the pixel area being broader than an individual spectrum for a single position of the radiation spot), and results in energy-resolution degradation. For example, the energy resolution of an entire pixel may be degraded by 2% relative to the energy resolution of one spot inside the pixel having a diameter of 300 µm.

Figure 4A:
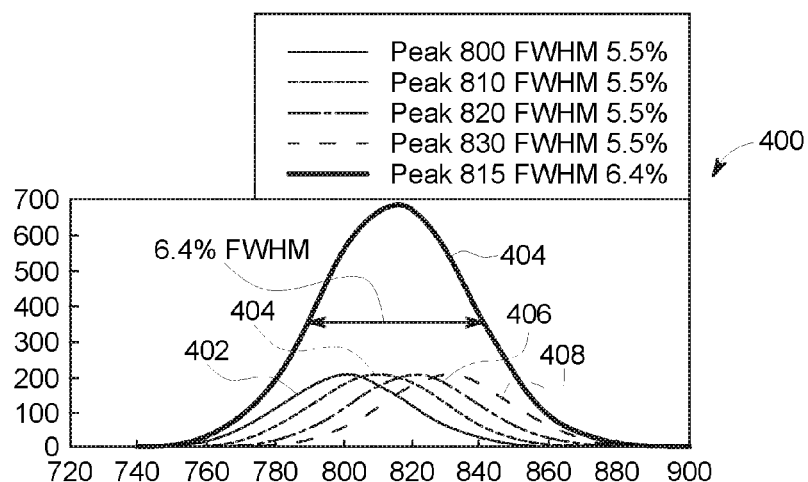
FIG. 4A shows an example of spectral broadening resulting from variation in peak position.

FIG. 4A illustrates an example of spectral broadening resulting from variation in peak position. FIG. 4A provides a graph 400 of various spectra, with counts plotted against energy level. As with FIG. 2, the energy levels of FIG. 4A are in arbitrary units for ease and clarity of illustration. In FIG. 4A, four separate individual spectra are shown, namely a first individual spectrum 402, a second individual spectrum 404, a third individual spectrum 406, and a fourth individual spectrum 408. In FIG. 4A each individual spectrum corresponds to a signal received from a particular sub-pixel. Spectra 402-408 may be similar to the spectra related to points 310 of FIG. 3, which are acquired from sub-pixels similar to sub-pixels 150-156 of FIG. 1. For ease and clarity of illustration, each individual spectrum has a peak of about 200 counts and has a similar breadth as the other individual spectra; however, the location of the peak (as a function the energy level at which the peak number of counts is observed) varies for each individual spectrum with respect to the other individual spectra, as each individual spectrum corresponds to a differently located sub-pixel. It may be noted that, in practice, the spectra resulting from photons impacting different sub-pixels may have different peak count values, may have larger or smaller shifts in peak position relative to other individual spectra, and may be broader and/or narrower than other individual spectra.

The four individual spectra 402, 404, 406, and 408 are combined or added to form the summed spectrum 410. The individual spectra of FIG. 4A correspond to histograms of counts over a range of energy levels, and may be determined based on the primary signals. For example, the individual spectra may be from individual sub-pixels of the same pixel, with the summed spectrum 410 representing the energy spectrum for the entire pixel over a collection period (e.g., a time period between blankings of a read-out). As seen in FIG. 4A, the summed spectrum 410 has a breadth, corresponding to the energy-resolution, that is larger than any of the individual spectra due to the various shifts in energy peak positioning of the individual spectra. For example, in FIG. 4A, each individual spectrum is a Gaussian having a FWHM corresponding to energy-resolution of 5.5%, while the summed spectrum 410 has a FWHM corresponding to energy-resolution of 6.4%, with the summed spectrum 410 thus having worse resolution than any one individual spectrum. The energy-resolution in percentage is defined as the ratio between the FWHM of the Gaussian of the spectrum and the energy in which the Gaussian has its peak (peak-energy or peak-position) multiplied by 100.

Various embodiments eliminate or reduce spectral broadening and energy-resolution degradation by adjusting the energy peak positions of the individual spectra of sub-pixels of a pixel before combining the individual spectra to form a summed spectrum. For example, in some embodiments, the processing unit 120 of FIG. 1 may align the peak positions of the individual spectra before combining the individual spectra to form the summed spectrum 410. For example, a predetermined calibration parameter (see, e.g., FIG. 7 and related discussion) may be applied to each individual spectrum. The predetermined calibration parameter may be different for each sub-pixel, and may be configured to adjust the peak position of a given individual spectrum to match, coincide with, approximate, or approach an expected or ideal peak position based on a calibration performed for the individual sub-pixel. Alternatively, spectra may be aligned, for example, to a particular spectrum located in a central (or other) position related to other spectra, or to an average peak location (e.g., a peak position corresponding to a median or mean position of spectra to be combined). Alternatively, all the spectra may be calibrated and adjusted such that all their peaks are aligned to the same real known energy, such as the known energy of the measured radio isotopes. Such calibration may involve two measurements with two different isotopes as explained below in the description accompanying FIG. 7.

Figure 4B:
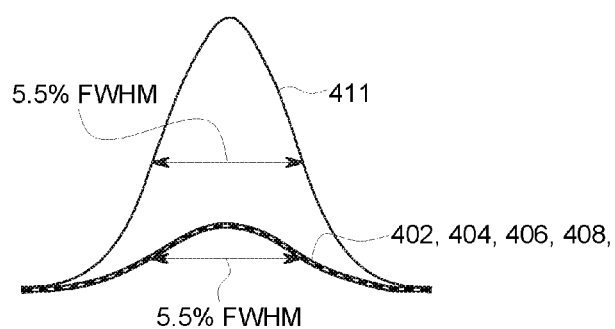
FIG. 4B shows an example of summing of aligned individual spectra, in accordance with an embodiment.

FIG. 4B provides an example of summing of peak aligned individual spectra. As seen in FIG. 4B, the four individual spectra 402, 404, 406, 408 are peak aligned (e.g., by application of one or more calibration parameters). Because the four individual spectra of the illustrated embodiment have the same peak count value and the same breadth, the four individual spectra overlap with each other as seen in FIG. 4B. Combining the four individual spectra after aligning their peaks to the same energy value provides the summed spectrum 411 depicted in FIG. 4B. The summed spectrum 411 has the same FHWM and/or breadth of the individual spectra, resulting in an improvement of about 1% in energy resolution relative to the summed spectrum 410 of FIG. 4A that was formed from non-aligned individual spectra. In the example of FIG. 4A and FIG. 4B, the individual spectra all have the same shape, breadth, and peak count value. It may be noted that, in some embodiments, the spectra may have different shape, breadth, and/or peak value. In some embodiments, where individual spectra have different breadths, the breadth of the combined spectrum may equal or approximate the breadth having a value between the values of the widest and the narrowest spectra when the individual spectra are aligned and combined. The weighted contribution of each spectrum of the summed spectra to the total breadth of the combined spectrum depends on how many events are included in each of these spectra. It may also be noted that, in addition to adjusting the peak position of the individual spectra, one or more other properties of the individual spectra may be adjusted before combining, such as an energy-amplitude (gain) and/or breadth, for example. In various embodiments, for each pixel, the processing unit 120 applies one or more calibration parameters to individual spectra based on sub-pixel location of the individual spectra to calibrate or improve alignment of the individual spectra and subsequently combines (e.g., sums) the calibrated, aligned, or adjusted individual spectra to provide a combined spectrum for the pixel.

Figure 5:
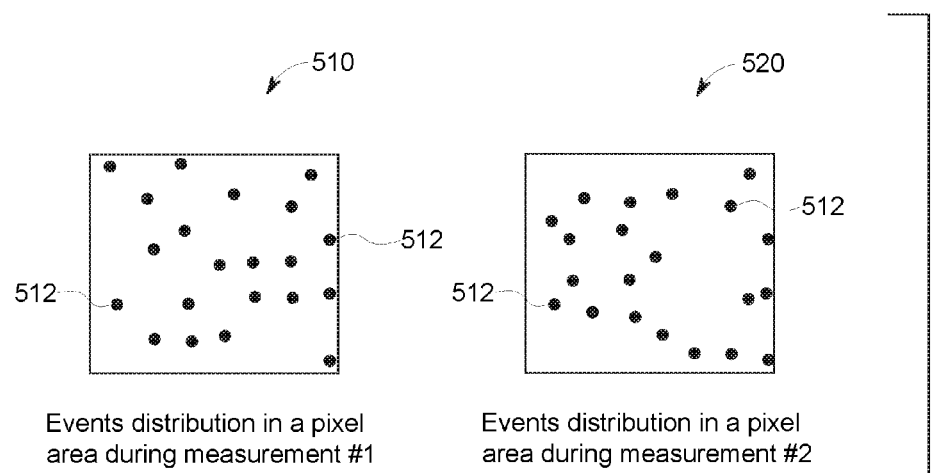
FIG. 5 shows examples of different event distributions over respective different collection or measurement periods for a single pixel.

In addition to reducing spectral broadening and improving energy resolution, various embodiments also improve gain stability. Due to variability in spatial distribution of events as well as variability in detected energy based on impact position, variation in peak position may occur. For example, FIG. 5 depicts examples of different spatial event-distributions over respective different collection or measurement periods for a single pixel. For instance, in the depicted example, a first distribution 510 of events 512 (e.g., photon impacts) may occur during a first measurement period, and a second, different spatial event-distribution 520 of events 512 may occur during a second measurement period. As seen in FIG. 5, the distribution of events 512 varies for the two depicted measurement periods. For each measurement, the events distribution over the pixel area may vary due to the time and space Poisson distribution of the radiation. The variance in distribution results in different spectral peak position, as for each event there may be a different peak position. By dividing the pixel into virtual sub-pixels and performing an energy calibration for each sub-pixel, improvements in gain stability may be achieved when combining the spectra for each sub-pixel to create a combined spectrum for a pixel.

As noted herein, the detected energy (e.g., number of counts distributed across a range of energy levels) for acquisition events varies based on the position at which the acquisition event occurs. In various embodiments, the processing unit 120 of FIG. 1 is configured to adjust detected energy based on the location of detection or reception of acquisition events such as photon impacts. In some embodiments, a predetermined calibration parameter (e.g., an offset used to adjust peak position as a function of energy level) or set of calibration parameters (e.g., offset and gain (used to adjust energy-amplitude, spectral breadth or the energy value of the peak count of a signal)) for each sub-pixel may be utilized by the processing unit 120 to adjust individual energy spectra based on location of detection of the individual energy spectra. For example, for each individual spectrum acquired during a collection period (e.g., a time between blankings of a readout), the processing unit 120 may determine a sub-pixel location for the individual spectrum, identify one or more predetermined calibration parameters to adjust the individual spectrum based on the sub-pixel location for the individual spectrum, apply the one or more calibration parameters, and add the adjusted individual spectrum to any other additional spectra acquired for the same pixel that have also been adjusted to provide a combined pixel spectrum for the collection period. The same general process may be performed for each pixelated anode of the detector (or detectors) of an imaging system, and may be repeated over a number of collection periods during the course of a scan.

As seen in FIG. 1, the depicted processing unit 120 is operably coupled to the detector 110 (e.g., the pixelated anodes 114 and/or associated electronic channels or processing circuitry), and is configured to acquire acquisition event information (e.g., primary and secondary signals) from the pixelated anodes, determine acquisition event location (e.g., by sub-pixel) using the primary and secondary signals (e.g., using conventional methods), adjust individual spectra based on acquisition event location, and combine the adjusted individual spectra for each pixel into a combined energy spectrum for the entire pixel. In various embodiments, by identifying specific locations of acquisition events (e.g., by sub-pixel) and adjusting detected or measured acquisition event energies based on the identified locations, the variance of measured energy as a function of detector location may be addressed, for example, to improve energy resolution and/or gain stability.

In various embodiments the processing unit 120 includes processing circuitry configured to perform one or more tasks, functions, or steps discussed herein. It may be noted that "processing unit" as used herein is not intended to necessarily be limited to a single processor or computer. For example, the processing unit 120 may include multiple processors, ASIC's and/or computers, which may be integrated in a common housing or unit, or which may distributed among various units or housings. It may be noted that operations performed by the processing unit 120 (e.g., operations corresponding to process flows or methods discussed herein, or aspects thereof) may be sufficiently complex that the operations may not be performed by a human being within a reasonable time period. For example, the mapping of virtual sub-pixels of a pixel, thresholding of primary and secondary signals, binning of information to generate individual spectra, determination of sub-pixel locations of acquisition events based on the primary and secondary signals, application of calibration parameters to individual spectra, and combination of adjusted individual spectra may rely on or utilize computations that may not be completed by a person within a reasonable time period.

In the illustrated embodiment, the processing unit 120 includes a mapping module 122, an acquisition module 124, a location determination module 126, an adjustment module 128, and a memory 130. It may be noted that other types, numbers, or combinations of modules may be employed in alternate embodiments, and/or various aspects of modules described herein may be utilized in connection with different modules additionally or alternatively. Generally, the various aspects of the processing unit 120 act individually or cooperatively with other aspects to perform one or more aspects of the methods, steps, or processes discussed herein.

In the illustrated embodiment, the depicted mapping module 122 is configured to define the locations of virtual sub-pixels within each pixel (pixelated anode) of one or more detectors with which the processing unit 120 is operably coupled. The particular number and location of sub-pixels may be determined based on a balance between improved spatial resolution for higher numbers of sub-pixels versus increased processing requirements for higher numbers of sub-pixels.

In the illustrated embodiment, the depicted acquisition module 124 is configured to acquire primary and secondary signals from each pixelated anode 114 of the detector 110. In some embodiments, signals from the pixelated anodes are thresholded to eliminate signals (e.g., noise) of lower strength than the secondary signals. The threshold may be set low enough to allow collection of secondary signals. In some embodiments, the processing unit 120 (or one or more aspects thereof) may be configured to assign a corresponding electrical channel to each pixelated anode. Each electrical channel may have associated therewith a threshold discriminator having a threshold level configured to allow collection of events corresponding to an induced electrical charge in an adjacent anode (secondary signal) caused by reception of a photon by the adjacent anode. The acquisition module 124 in various embodiments associates secondary signals and primary signals with location information (e.g., address or other identifier of the particular pixelated anode and the sub-pixels within the pixelated anode from which a signal was obtained) and timing information (e.g., time-stamp corresponding to generation of signal).

In some embodiments, the acquisition module 124 may then use the primary signal to generate an individual energy spectrum for each sub-pixel corresponding to the number of counts at different energy levels over a range of energy levels. For example, the processing unit 120 may bin primary signals for each sub-pixel based on energy level to provide a histogram of counts of primary signals plotted against energy level to generate a sub-pixel energy spectrum for each sub-pixel with which an acquisition event is associated over a collection period.

The depicted location determination module 126 determines location, by sub-pixel, for each primary signal or acquisition event using the primary signals and the secondary signals. For example, the location determination module 126 may use a pixel address associated with a given primary signal by the acquisition module 124 to determine the particular pixel for the given primary signal. The location determination module 126 may then identify any secondary signals from one or more adjacent periods at or near same instant in time to determine which particular sub-pixel of the pixel is the location of the given primary signal based on the strengths and positions of the primary and secondary signals from the primary and adjacent pixels, respectively.

The depicted adjustment module 128 applies one or more calibration parameters to each individual spectrum and then combines the individual spectra of the sub-pixels of each pixel to provide a combined pixel spectrum for each pixel. For example, the calibration parameter(s) may be determined during a calibration performed on a detection system before use of the detection system for imaging. In some embodiments, a known or calibrated radiation source (for example, radiation from an isotope having a known energy distribution including peak count and peak location as a function of energy level) may be used to irradiate the detector. Next, primary and secondary signals are obtained, and an individual spectrum for each sub-pixel of each detector is generated. The individual spectra are next each compared and adjusted or calibrated to the expected spectrum based on the known energy distribution(s) of the calibrated radiation source.

For any spectra differing from the expected spectrum (e.g., having a peak location, peak count value, or the like differing from a corresponding value for the expected spectrum by more than a predetermined tolerance), a calibration parameter may be determined to adjust the individual spectra to match or correspond to the expected spectrum. For example, when a peak location (energy level at which the counts are a maximum) of the individual spectrum of a particular sub-pixel differs from the expected peak location, an offset may be determined to align the spectrum of the particular sub-pixel with the expected spectrum. As another example, when peak value (number of counts at the peak) differs, a gain adjustment may be determined to match the peak value of the particular sub-pixel with the expected spectrum. It may be noted that in embodiments that utilize two or more calibration parameters, two or more isotopes having a known energy may be utilized to solve for the two calibration parameters. For example, for embodiments that apply an offset correction and a gain correction, two known isotopes may be utilized.

The calibration determination may be performed for each sub-pixel, with the corresponding values of the calibration or correction parameters saved for each sub-pixel, for example in a lookup table stored in the memory 130 and accessible by the adjustment module 128. During subsequent scanning or collection of imaging information, when an individual spectrum is generated by the acquisition module 124 for a particular sub-pixel, the adjustment module 128 may use information from the location determination module 126 to identify the appropriate calibration parameters for the individual spectrum, and apply the appropriate calibration parameters to improve the alignment of the individual spectrum to any other individual spectra of the pixel (which are also adjusted based on sub-pixel location) before combining the spectra.

The memory 130 may include one or more computer readable storage media. The memory 130, for example, may store mapping information describing the sub-pixel locations, acquired emission information, image data corresponding to images generated, results of intermediate processing steps, calibration parameters for each sub-pixel, or the like. Further, the process flows and/or flowcharts discussed herein (or aspects thereof) may represent one or more sets of instructions that are stored in the memory 130 for direction of operations of the radiation detection assembly 100.

It may be noted that while the processing unit 120 is depicted schematically in FIG. 1 as separate from the detector 110, in various embodiments, one or more aspects of the processing unit 120 may be shared with the detector 110, associated with the detector 110, and/or disposed onboard the detector 110. For example, in some embodiments, at least a portion of the processing unit 120 is integrated with the semiconductor detector 110. In various embodiments, at least a portion of the processing unit 120 includes at least one application specific integrated circuit (ASIC) or field programmable gate array (FPGA) that is disposed onboard or integrated with the semiconductor detector 110.

Figure 6:
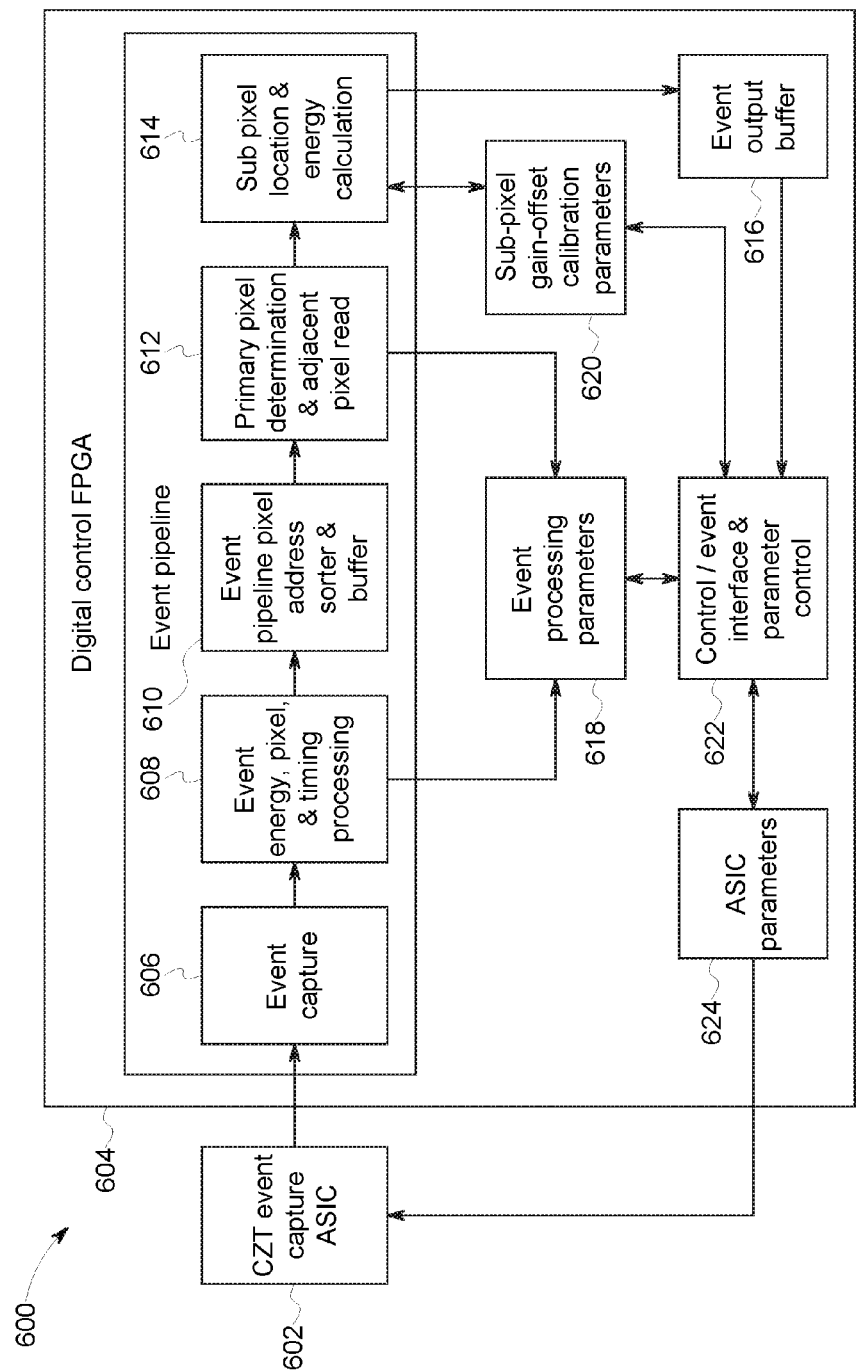
FIG. 6 shows a schematic view of a processing system, according to an embodiment.

FIG. 6 is a schematic view of a processing system 600 that may be used with a radiation detection system (e.g., radiation detection assembly 100 of FIG. 1) in accordance with various embodiments. The processing system 600 includes an ASIC 602 and an FPGA 604. One or both of the ASIC 602 or the FPGA 604 may be disposed onboard or integrated with a detector (e.g., semiconductor detector 110).

In the illustrated embodiment, the ASIC 602 is electrically coupled to anodes of a detector, such as, anodes 114 of detector 110, and used for event capture on a detector, and is communicably coupled to the FPGA 604, and provides the FPGA 604 with signals detected by and captured from the detector. The signal information from the ASIC 602 is communicated to the FPGA 604, and acquired by the Event Capture module 606 of the FPGA 604. In the illustrated embodiment, the Event Capture module 606 may control the request-acknowledge communication mechanism to the ASIC 602, as previously discussed. The Event Energy, Pixel, and Timing Processing module 608 of the FPGA 604 processes the acquired information. For example, energy distribution information from acquired signals (e.g., count values at various energy levels distributed over a range) may be associated with pixel information (e.g., a location address or other identifying associating a primary signal or secondary signal with the particular pixelated anode at which the signal was captured, detected, or recorded) and timing information (e.g., time stamp). The Event Pipeline Pixel Address Sorter & Buffer module 610 of the FPGA 604 organizes and stores event information (e.g., all event information over a given collection period), and the Primary Pixel Determination and Adjacent Pixel Read module 612 identifies the pixels (pixelated anodes) for which a primary signal has been received, and also identifies any adjacent pixels (pixels adjacent to a primary signal pixel) that have secondary signals within a predetermined time range of a primary signal.

The Sub-Pixel Location and Energy Calculation module 614 of the FPGA 604 determines, for each given pixel having a primary signal, the sub-pixel location for the primary signal based on the primary signal for the given pixel and any secondary signals for pixels adjacent to the primary signal pixel occurring at or near the same time. Module 614 in various embodiments may also generate signal histograms (counts at various energy levels) for the primary and secondary signals. Further, module 614 in various embodiments also adjusts the energy spectrum for each sub-pixel using calibration parameters, stored in the Sub-pixel Gain-Offset Calibration Parameters Memory module 620, for the given sub-pixel, and combines the adjusted spectra for each pixel to provide combined pixel energy spectra. In the illustrated embodiment, the Event Output Buffer module 616 of the FPGA 604 stores the results of the sub-pixel location and energy determinations (calibrations) performed by module 614. As seen in FIG. 6, the FPGA 604 also includes the Event Processing Parameters Memory module 618, which control how events are acquired, processed, and stored; the Sub-pixel Gain-Offset Calibration Parameters Memory module 620, which stores calibration parameters for each sub-pixel and is accessible by module 614; the ASIC Parameters Memory module 624, for use in conjunction with communication and operation of the ASIC 602; and the Control/Event Interface and Parameter Control module 622.

Figure 7:
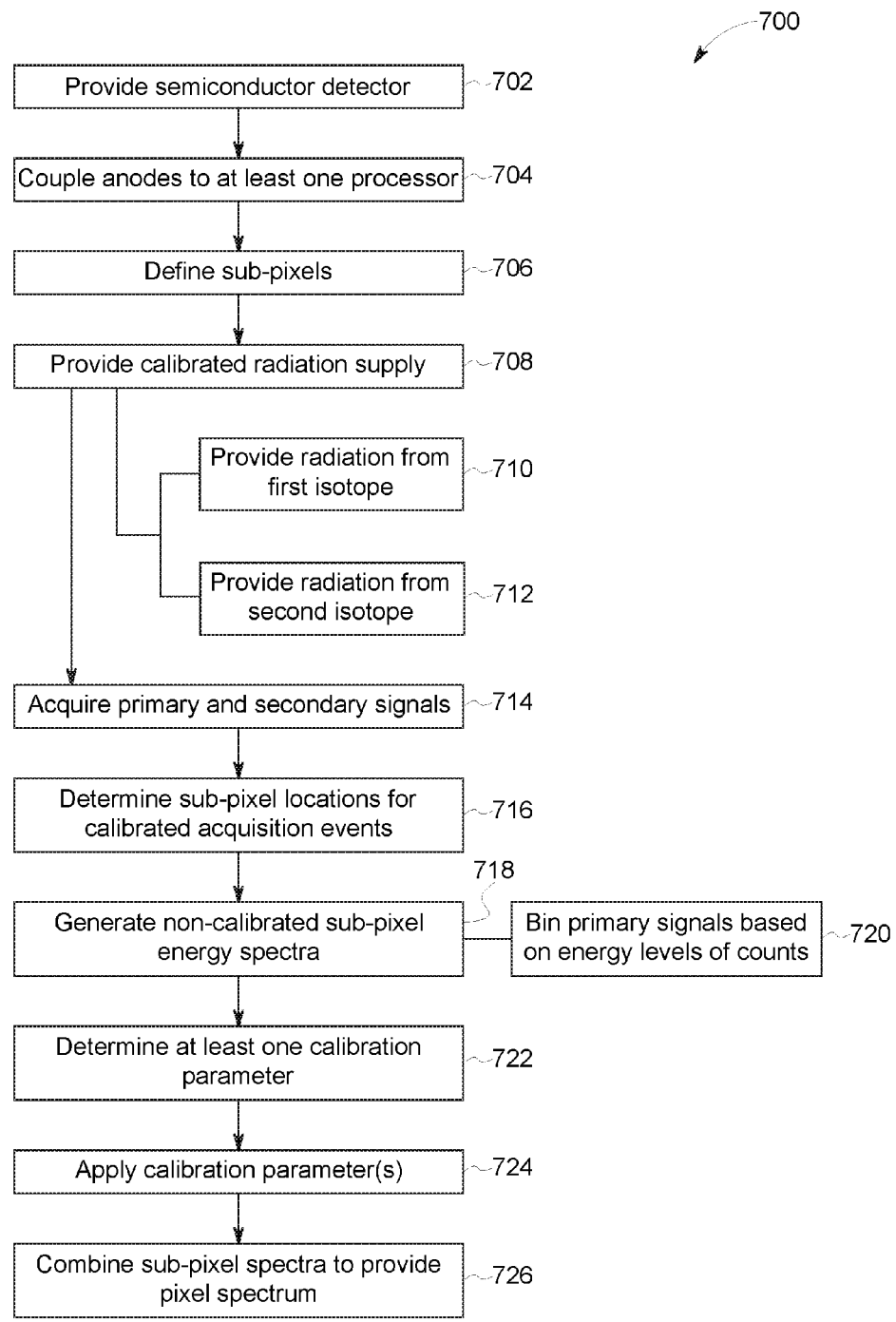
FIG. 7 shows a flowchart of a method, according to an embodiment.

FIG. 7 provides a flowchart of a method 700 for calibrating a detector or detector system, in accordance with various embodiments. The method 700, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 700 may be able to be used as one or more algorithms to direct hardware (e.g., one or more aspects of the processing unit 120) to perform one or more operations described herein.

At 702, a semiconductor detector (e.g., semiconductor detector 110 of FIG. 1) is provided. Generally, the semiconductor detector for the illustrated embodiment includes a reception surface configured to receive radiation (e.g., photons). A grid, matrix, or array of pixelated anodes are disposed on the reception surface, with each pixelated anode configured to produce signals that are identifiable as being originated from the particular pixelated anode (e.g., having an address or other identifier associated therewith). The anodes (and/or associated processing circuitry) generate primary signals responsive to impact of a photon within the pixel itself, and secondary signals responsive to induced charges on neighboring or adjacent pixels induced by impact of photons within other adjacent or neighboring pixels where the primary signals are generated.

At 704, the pixelated anodes of the detector are coupled to at least one processor (e.g., processing unit 120). All or a portion of the at least one processor may be housed separately from the detector and/or disposed onboard or otherwise integrated with the detector. At least one processor may include or have associated therewith processing circuitry corresponding to electronic channels, with each channel assigned to a particular pixelated anode. Each channel may include, for example, a Peak & Hold (P&H) unit and threshold discriminator circuitry configured to prevent or inhibit transmission of signal that is not as strong as the secondary signals. In some embodiments, each channel may also associate timing and location (e.g., pixel address) information with each signal transmitted via the channel.

At 706, the at least one processor defines sub-pixels for each pixelated anode and derives the sub-pixel locations (sub-pixel addresses) within the pixelated anode. The sub-pixels are virtual sub-pixels defined by the at least one processor, and are not physically separated or distinct in the depicted embodiment. In various embodiments, between 4 and 9 sub-pixels are defined for each pixel. In some embodiments, the sub-pixels may be uniform in size and symmetrically distributed. It may be noted that in other embodiments the sub-pixels may not be uniform in size and/or may be non-symmetrically distributed along the pixel.

At 708, with sub-pixels defined and the at least one processor operably coupled to the detector, the detector (e.g., the reception surface of the detector including the pixelated anodes) is irradiated with a calibrated radiation supply. The radiation supply may include radiation from one or more isotopes having known or expected corresponding energy distributions (e.g., detector counts distributed across a range of energy levels). The calibrated radiation supply, for example, may be provided uniformly to all pixels of the detector, or may be provided individually for each sub-pixel of the pixels by providing each sub-pixel with its specific energy-calibration parameters in a predetermined pattern, as another example. Generally, the radiation supply is configured to provide radiation that will impact each sub-pixel of each pixel during a calibration process.

In the depicted embodiment, two calibration parameters (offset adjustment and gain adjustment) are to be determined for each sub-pixel. Accordingly, the calibrated radiation supply may include two isotopes having different known or expected energy distributions to facilitate solving for two calibration parameters. At 710, radiation from a first isotope is provided to the pixelated anodes, and at 712 radiation from a second isotope is provided to the pixelated anodes.

At 714, primary signals and secondary signals generated by the pixelated anodes responsive to the calibrated radiation supply are acquired by the at least one processor. Each primary and secondary signal may have associated therewith location information (identifying the particular pixel for which the signal was generated) and timing information (identifying a time corresponding to the generation of the signal).

At 716, sub-pixel locations are determined for calibrated acquisition events. For example, for each acquisition event resulting in a primary signal, the pixel location may be identified by the associated location information, and the sub-pixel location may be determined based on primary and secondary signals from primary and adjacent pixels caused by induced charges for the acquisition event.

At 718, for following the energy-calibration steps 710 and 712 including irradiating a detector by two different radio-active-isotopes, non-calibrated sub-pixel energy spectra are generated for each sub-pixel. For example, at 720, the at least one processor may bin primary signals for each sub-pixel based on energy level to provide a histogram of counts per energy level to generate a non-calibrated energy spectrum for each sub-pixel for each radiation energy irradiating a detector in energy-calibration steps 710 and 712.

At 722, at least one calibration parameter is determined based on the non-calibrated spectra generated in step 718 and the known radiation energies provided by steps 710 and 712. In the illustrated embodiment, two calibration parameters, namely an offset correction, and a gain correction, are determined for each sub-pixel. The offset correction is configured to align the peak location (e.g., energy level at which the most counts are recorded) of the determined energy spectra for a given sub-pixel with the peak location of the spectra corresponding to the known isotopes, and the gain correction is configured to match the values of the energy and the breadth of the peak of the non-calibrated spectra with the peak values of the spectra corresponding to the known isotopes used in steps 710 and 712. Other calibration parameters may be employed additionally or alternatively in various embodiments. Generally, to determine the calibration parameters for any given sub-pixel, the spectrum for the sub-pixel is compared to the expected or known spectrum (or spectra), and the calibration parameters are determined to align or match the sub-pixel spectrum with the known spectrum. It may be noted that a number of individual spectra for each sub-pixel may be generated and averaged to generate an average spectra for the particular sub-pixel, with the average spectra compared to the known spectra to determine the appropriate calibration parameters.

At 724, the determined calibration parameters may be applied to the non-calibrated spectra of step 722 for each sub-pixel to provide calibrated, adjusted or aligned spectra for each sub-pixel, and at 726 the adjusted or aligned spectra for each sub-pixel of a given pixel may be combined to provide a combined spectrum for the entire given pixel. The results of either 724 or 726 may be compared to the expected or known spectrum to confirm the suitability of the determined calibration parameters.

Figure 8:
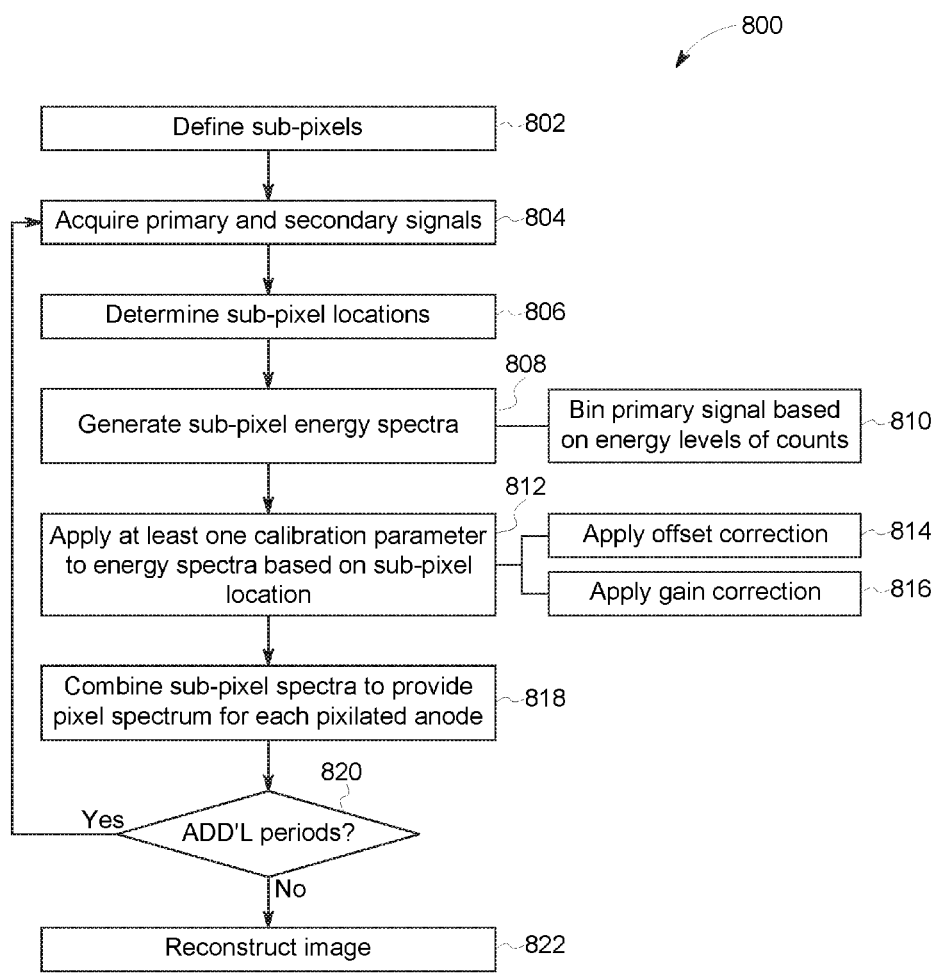
FIG. 8 shows a flowchart of a method, according to an embodiment.

FIG. 8 provides a flowchart of a method 800 for radiation detection, in accordance with various embodiments. The method 800 may be utilized, for example, in connection with nuclear medicine imaging to detect radiation emitted from a patient or other object to be imaged. The method 800, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 800 may be able to be used as one or more algorithms to direct hardware (e.g., one or more aspects of the processing unit 120) to perform one or more operations described herein.

At 802, sub-pixels are defined (e.g., by at least one processor such as processing unit 120 of FIG. 1) for each pixelated anode (e.g., pixelated anode 114) of a detector (e.g., semiconductor detector 110). In various embodiments, the sub-pixels are virtual (in contrast to physical) subdivisions of the various pixelated anodes constructed or defined by a processor.

At 804, primary signals and secondary signals are acquired corresponding to acquisition events from the pixelated anodes. For example, a patient that has been administered at least one radiopharmaceutical may be placed within a field of view of one or more detectors, and radiation (e.g., photons) emitted from the patient may impact the pixelated anodes disposed on receptions surfaces of the one or more detectors resulting in acquisition events (e.g., photon impacts). Photon impacts in the illustrated embodiment result in a primary signal generated by the impacted pixelated anode and secondary signals generated by pixelated anodes adjacent to the impacted pixelated anode.

At 806, sub-pixel locations are determined for the acquisition events using the primary and secondary signals. For example, as discussed herein, the pixel location for a given acquisition event may be determined by the location associated with the primary signal, and the sub-pixel location may be determined using primary and secondary signals of primary and adjacent pixels when the secondary signals are associated with the primary signal (e.g., associated by proximity in time).

At 808, a sub-pixel non-calibrated energy spectrum for the radiation emitted by the radiopharmaceutical is generated using the primary signals. For example, at 810, primary signals for each sub-pixel may be binned based on energy level to provide a non-calibrated histogram of counts per energy level to generate an individual non-calibrated energy spectrum for each sub-pixel.

At 812, one or more calibration parameters (e.g., parameters determined for each sub-pixel, such as, offset and/or gain, as discussed in connection with FIG. 7) are applied to each individual non-calibrated energy spectrum, based on the sub-pixel location of the spectra to form calibrated spectra for each sub-pixel. For example, a calibration parameter (or set of parameters) may be predetermined and stored for each sub-pixel. Then, for any given individual energy spectrum, the calibration parameters are retrieved based on sub-pixel location of the individual energy spectrum. Generally, the calibration parameters are configured to align the individual spectra with each other. For example, the calibration parameters may be configured to align each individual spectra with one or more known or expected spectra utilized during a calibration process. It may be noted that in various embodiments the alignment may not be exact, but instead within a predetermined tolerance or range of the known or expected spectra. In the illustrated embodiment, two calibration parameters are applied to each individual spectrum. At 814, an offset correction parameter is applied to shift or adjust the peak location of the individual spectra, and, at 816, a gain correction parameter is applied to shift or adjust the peak value of the individual spectra.

At 818, for each pixelated anode, the individual spectra corresponding to any acquisition events over a given collection period for the sub-pixels of the pixelated anode are combined (after adjustment of the individual spectra using the calibration parameters at 812) to provide a pixelated anode spectrum for the entire anode. As discussed herein, the pixelated anode spectrum for the entire anode generated at 818 has improved energy resolution and/or gain stability relative to a pixel spectrum of the entire anode generated with non-adjusted or non-corrected individual spectra of the sub-pixels, due for example to variance of energy distribution for different portions of the reception surface of the detector within the areas of the pixelated anodes.

At 820, it is determined if additional collection periods are to be performed. For example, after each collection period, the readouts of electronics associated with the pixelated anodes may be blanked or re-set to detect additional acquisition events occurring at a subsequent time. The imaging information acquired during a particular scan may be acquired over a number of individual collection periods, with the information for all of the collection periods used to reconstruct an image. If additional collection periods are to be performed, the readouts for the various channels associated with the pixelated anodes may be blanked or re-set, and the method 800 returns to 804 for acquisition of primary and secondary signals for the new collection period. If no additional collection periods are to be performed, the depicted method proceeds to 822, at which imaging information (e.g., acquired imaging information and/or processed imaging information such as the combined spectra for the pixels generated using the corrected or adjusted individual spectra of the sub-pixels as well as the determined pixel and/or sub-pixel locations) acquired and/or generated during the scan is used to reconstruct an image of the object that was scanned. It may be noted that the time between acquisition periods in 820 may be long as the time between the periodic calibrations used according to the imaging-system specifications, such as maintenance instructions.

Figure 9:
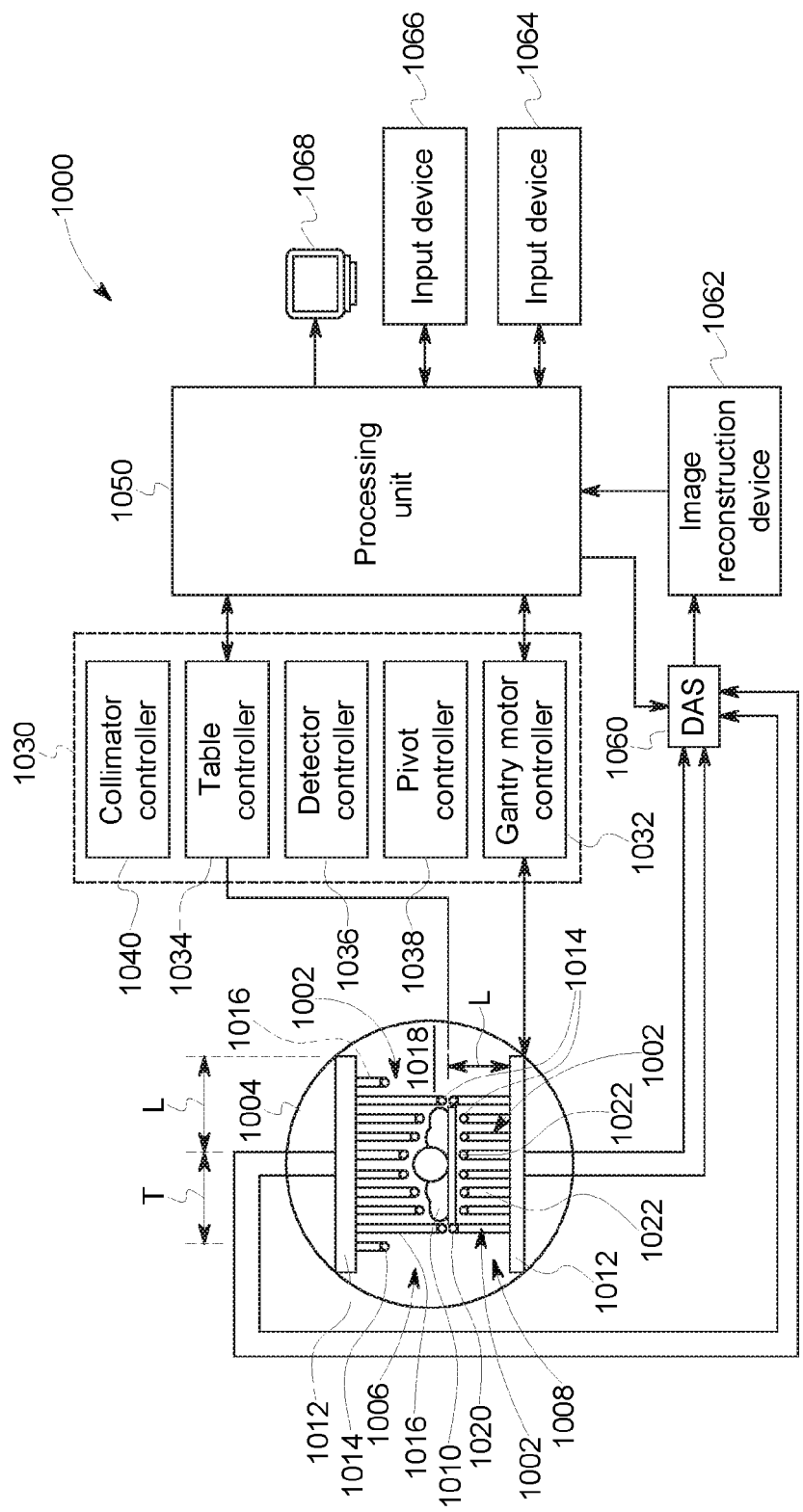
FIG. 9 shows a schematic view of an imaging system, according to an embodiment.

The embodiments described herein by FIGS. 1-8 may be implemented in medical imaging systems, such as, for example, SPECT, SPECT-CT, PET and PET-CT. Various methods and/or systems (and/or aspects thereof) described herein may be implemented using a medical imaging system. For example, FIG. 9 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 9 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 9. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 9). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

The collimators 1022 (and detectors) in FIG. 9 are depicted for ease of illustration as single collimators in each detector head. Optionally, for embodiments employing one or more parallel-hole collimators, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 10). In various embodiments, the detector controller 1036 may control the detector carriers 1016 or the support members 1012 to move in different lateral directions. Detector controller 1036 may control the swiveling motion of detectors 1002 together with their collimators 1022. In some embodiments, detectors 1002 and collimators 1022 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 9 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

It may be noted that imaging systems may include a relatively large number of pixels. For example, some imaging systems include multiple detectors, with each detector in turn including many pixels. However, not all of the pixels are the same. Due to inhomogeneity of material properties, for example, the pixels may have different sensitivity. Accordingly, when a detector head (or heads) of an imaging system is irradiated by a uniform radiation flux of photons, the number of photons counted or number of events within the energy window of the imaging system may not by the same for all of the pixels.

Figure 14:
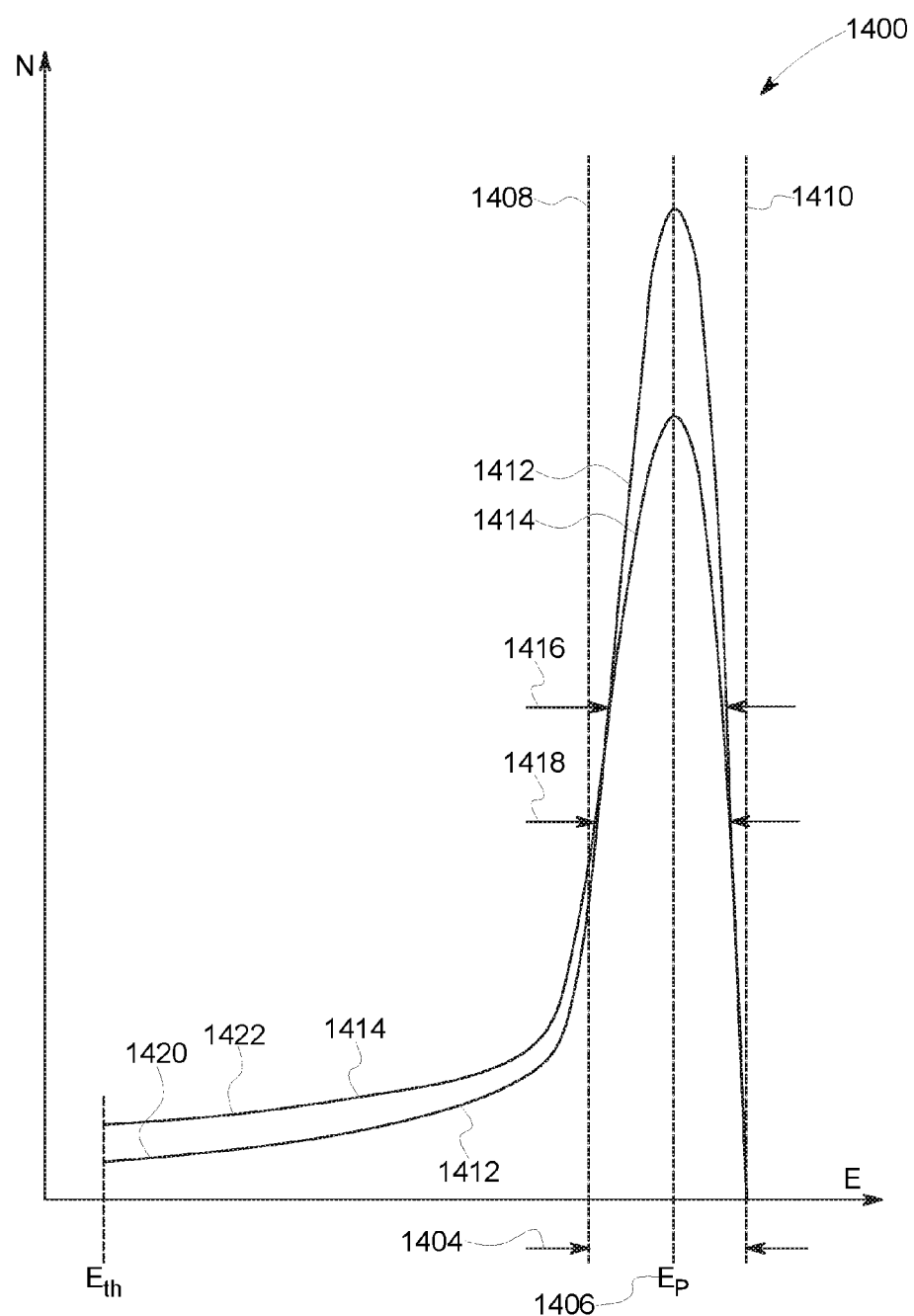
FIG. 14 illustrates curves of two spectra representing histograms of event counts versus measured energy of the events.

Further, because each individual pixel may include multiple regions within the individual pixel that are inhomogeneous (e.g., having different sensitivity), calibrating on a per pixel bases may not provide a desired level of uniformity. For example, FIG. 14 illustrates a plot 1400 of curves of spectrum 1412 and spectrum 1414. Spectra 1412 and 1414 are histograms of a number of events N measured versus the measured energy of the events as measured by the pixels. It may be noted that spectra 1412 and 1414 may represent the different spectra of different regions within a pixel.

As seen in FIG. 14, the energy window 1404 has an energy width $\Delta E$. The energy range of the energy window 1404 starts at energy 1408 and ends at energy 1410, and includes the peak energy 1406. In FIG. 14, the two regions corresponding, respectively, to spectrum 1412 and spectrum 1414 collect the same amount of radiation from a point source. Accordingly, the total number of events of spectra 1412 and 1414 are the same. However due to the different widths (FWHM) 1416 and 1418, and differing low energy tails (low energy tail 1420 of spectrum 1412, and low energy tail 1422 of spectrum 1414), the number of events of spectra 1412 and 1414 within energy window 1404 differs from each other. As such, the spectra 1412 have different sensitivity, where the sensitivity $S_i$ for a given region of a detector (e.g., pixel or sub-pixel) is defined as $S_i$=(the number of events inside energy window 1404)/(the number of events received).

It may be noted that a radiation source (e.g., a point radiation source) may have a Poisson distribution not just in time but also in space. Thus, even when the total number events collect by a pixel has a contrast substantially larger than noise, the internal distribution within the pixel will still have statistical noise. Accordingly, even for a relatively large number of events, the internal distribution throughout a given pixel or pixels over different regions having different sensitivity may not by the same. As such, for each measurement, pixels may produce a different number of events within the energy window (e.g., energy window 1404). Accordingly, when only looked at from a per-pixel basis, the gray-levels produced by pixels vary even after performing a per-pixel uniformity-map calibration.

The size of non-uniform regions within pixels is relatively small, and imaging is generally performed with a collimator having a substantial attenuation factor. Accordingly, attempting to acquire uniform results calibrating only on a per-pixel basis may require an impractically large acquisition time.

Various embodiments provide for improved calibration. In various embodiments, pixels are divided into virtual sub-pixels. Sub-pixel locations for events may be determined using primary (or collected) signals and secondary (or non-collected or induced) signals as discussed herein. Uniformity-map calibrations may then be performed for each virtual sub-pixel, providing improved results compared to use of only physical pixels.

The number of counts measured within an energy window of the system may be converted into gray-levels of a reconstructed image. When the detector's pixels provide different counts when irradiated by a uniform flux of photons, different gray-levels are produced in different locations of the resulting image. Accordingly, the image produced in response to uniform radiation is not uniform, or has non-uniform gray levels, and should be corrected to improve imaging results.

In various embodiments, correction of gray-levels, or correction of detector inhomogeneity, is performed by applying to each pixel a correction or calibration factor (or factors) that brings all of the gray-levels of pixels into the same predefined gray level (or within a predefined range of gray levels) after the detector is irradiated by a uniform flux of photons. In some embodiments, the predefined gray-level may be the pixel with the highest or lowest gray-level in the detector. Alternatively the predefined gray-level may be selected as desired. For example, the predefined gray-level may correspond to an expected value based on known properties of the radiation source and a known time of exposure.

In various embodiments, a calibration procedure that is performed may be referred to as uniformity-map calibration. Deriving the calibration factor for each pixel and calibrating the uniformity-map may be performed as follows: First, a desired gray-level (DG) is defined. Next, a desired number of events (DN) is defined corresponding to the desired gray-level (DG). Next, an actual number of events ($AN_i$) is measured for events in pixel i, with i being the index number of the pixel. The calibration factor $K_i$ for pixel i may then be defined as $K_i$=DN/$AN_i$. The corrected or calibrated number of events $N_i$ for a given pixel i may then be defined as $N_i$=$AN_i$*$K_i$. Accordingly, a uniformity map may be produced by deriving the gray-level corresponding to the corrected or calibrated number of events for each pixel i (defined as $N_i$), which in the calibrated uniformity-map is equal to the desired number of events (DN) and thus corresponds to the desired gray-level (DG). As such, such a calibrated uniformity-map provides for pixels having a gray-level equal to a desired gray-level (or within a desired range) and is accordingly homogeneous (or within a desired range of homogeneity).

As discussed herein, in various embodiments, calibration parameters are applied on a sub-pixel basis (e.g., a different calibration parameter value for each of different virtual sub-pixels of a given physical pixel or pixels). For example, with continued reference to FIG. 1, in some embodiments, each pixelated anode (and/or corresponding pixel) may include virtual sub-pixels (e.g., pixelated anode 114a includes sub-pixels 150, 152, 154, 156), which are defined for each physical pixelated anode and/or each physical pixel. In various embodiments, the processing unit 120, in addition to defining the sub-pixels, acquires signals corresponding to acquisition events from the pixelated anodes. For example, the signals may include primary signals generated responsive to reception of a photon by a pixelated anode and secondary signals responsive to an induced charge caused by reception of a photon by at least one adjacent pixelated anode. The processing unit 120 is also configured to determine sub-pixel locations for the acquisition events, and to apply at least one calibration parameter on a per sub-pixel basis for the acquisition events based on the determined sub-pixel locations. For example, a calibration parameter may have a first value for sub-pixel 150, a second value for sub-pixel 152, a third value for sub-pixel 154, and a fourth value for sub-pixel 156. The first value may then be applied to events detected corresponding to sub-pixel 150, the second value applied to events detector corresponding to sub-pixel 152, the third value applied to events detected corresponding to sub-pixel 154, and the fourth value applied to events detected corresponding to sub-pixel 156.

For example, in some embodiments, the at least one calibration parameter includes a sensitivity calibration parameter. The sensitivity calibration parameter may be utilized to adjust counts on a per sub-pixel basis. In some embodiments, the at least one calibration parameter includes a sub-pixel count parameter for each sub-pixel. The processing unit 120 adjusts a total number of counts for acquisition events for each sub-pixel using the corresponding sub-pixel count parameter. The following table provides an example of the application of a sub-pixel count parameter for sub-pixels 150, 152, 154, 156 of pixel 114a.

| Sub-Pixel | Detected Counts for Sub-Pixel | Value of Sub-Pixel Count Parameter | Adjusted or Calibrated Counts for Sub-Pixel |
|---|---|---|---|
| 150 | v | A | A * v |
| 152 | x | B | B * x |
| 154 | y | C | C * y |
| 156 | z | D | D * z |

It may be noted that each of the sub-pixel adjustment parameters (e.g., sub-pixel count parameter as discussed above) may be independently determined for each sub-pixel. It may also be noted that the sub-pixel adjustment parameters may be applied to each of the sub-pixels before combining the sub-pixel signals for corresponding signals. For example, each of the sub-pixel count parameters may be applied to the corresponding detected counts for each sub-pixel to provide an adjusted or calibrated count for each sub-pixel, with the adjusted or calibrated count for each sub-pixel then used in conjunction with the adjusted or calibrated counts for the other sub-pixels, for example, to determine sub-pixel locations for detected events and/or to reconstruct an image.

Figure 10:
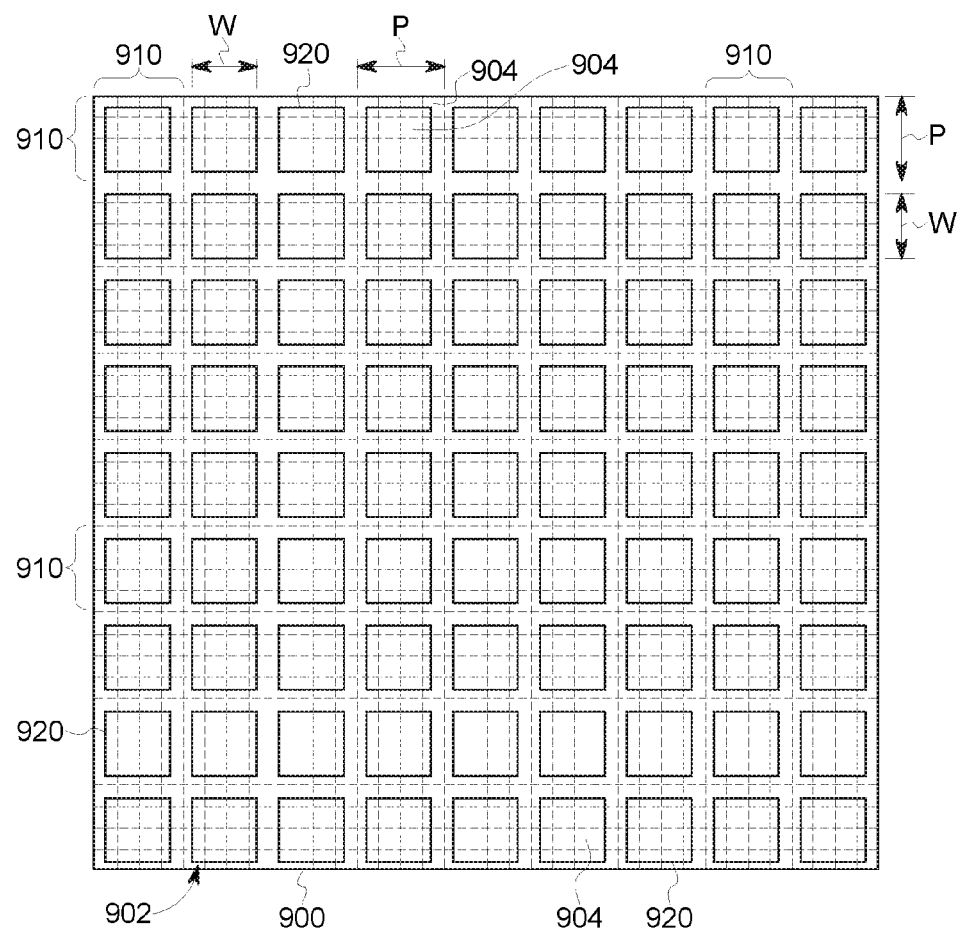
FIG. 10 provides a schematic view of a semiconductor detector, detector according to an embodiment.

FIG. 10 provides a schematic view of a semiconductor detector 900, according to an embodiment. The semiconductor detector 900 in various embodiments may be used as semiconductor detector 110 and/or share one or more aspects in common with semiconductor 110. As seen in FIG. 10, the semiconductor detector 900 has a surface 902 on which pixelated anodes 920 are distributed. The semiconductor detector 900 is divided into a grid of pixels 910, with each pixel 910 having a corresponding pixelated anode 920. In the illustrated embodiment, the pixels 910 have a larger area than the corresponding pixelated anodes 920 (e.g., the pixels 910 may include areas that correspond to septa dividing the pixelated anodes 920 and/or other inactive areas between the pixelated anodes 920). Each pixel 910 extends along the surface 902 for a distance P (equal to the pixel pitch of the detector 900) in both a width and a length direction. Accordingly each pixel 910 has an area of P*P. Similarly, each pixelated anode 920 extends along the surface 902 for a distance W (equal to the width of the pixelated anode 920) in both a width and a length direction. Accordingly each pixelated anode 920 has an area of W*W. It may be noted that, while square shaped pixels and pixelated anodes are shown in the illustrated embodiment, other sizes and/or shapes of pixels and/or pixelated anodes may be utilized in other embodiments.

As also seen in FIG. 10, each pixel 910 (and corresponding pixelated anode 920) may be understood as being divided into or including sub-pixels 904. Divisions between sub-pixels 904 are shown in dashed lines in FIG. 10. As seen in FIG. 10, each pixel 910 includes a grid of sub-pixels 904 that extend over the entire surface of the pixel 910, with the grid of sub-pixels 904 extending beyond the borders of the corresponding pixelated anode 920. It may be noted that the sub-pixels 904 in the illustrated embodiment are not physically separate from each other, but instead are virtual entities (e.g., defined by a processing unit such as the processing unit 120).

Figure 11:
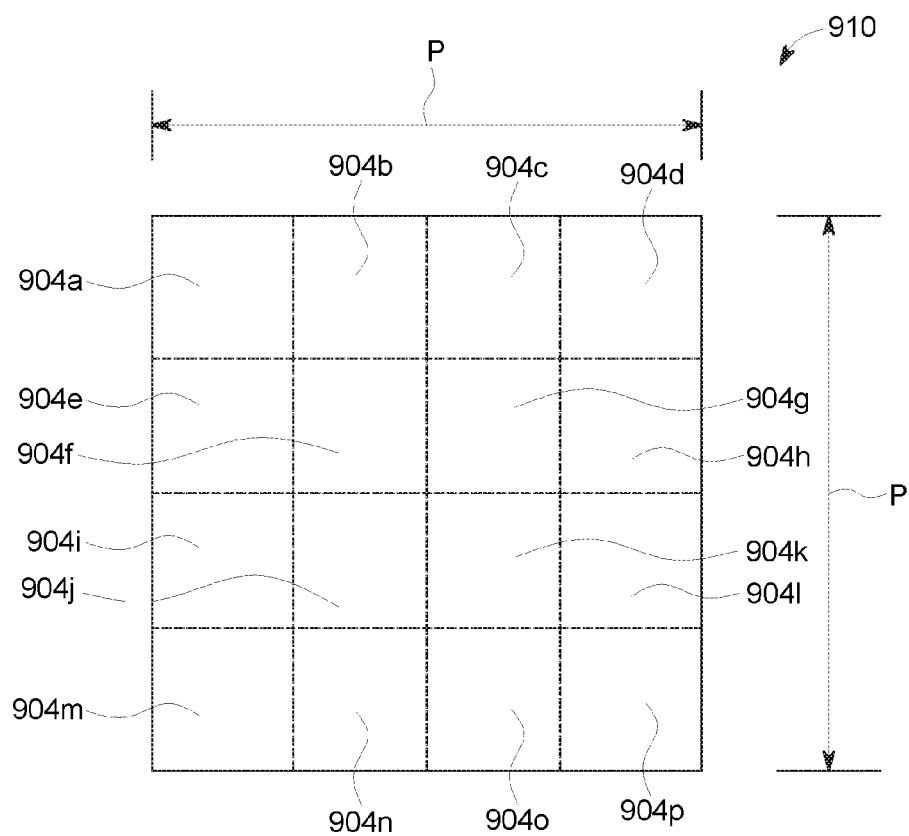
FIG. 11 provides an enlarged view of a pixel of the semiconductor detector of FIG. 10.

FIG. 11 provides an enlarged view of a pixel 910 of the semiconductor detector of FIG. 10. In the illustrated example, the pixel 910 includes a 4×4 grid of sub-pixels 904 for a total of 16 sub-pixels 904 (904a, 904b, 904c, 904d, 904e, 904f, 904g, 904h, 904i, 904j, 904k, 904l, 904m, 904n, 904o, 904p). It may be noted that the depicted embodiment is meant by way of example, and that other shapes and/or numbers of sub-pixels may be employed in other embodiments. For example, the depicted pixel 910 includes a 4×4 grid of sub-pixels 904; however, in other embodiments, each pixel may include a 2×2 grid of sub-pixels, or a 3×3 grid of sub-pixels, among others. Each sub-pixel 904a, 904b, 904c . . . in the illustrated embodiment has associated therewith an independently determined calibration parameter applied to counts and/or energies associated with the particular sub-pixel (e.g., identified as being absorbed at a location corresponding to the particular sub-pixel).

In various embodiments, at least one processor (e.g., processing unit 120) is configured to apply a uniformity map calibration to the signals. For example, each sub-pixel 904 may have a calibration parameter of a uniformity map that is mapped to the sub-pixel, with the uniformity map of calibration parameters applied to the signals generated for each sub-pixel to address inconsistencies between the sub-pixels.

Generally, physical pixels (e.g., pixels 910) may be divided into multiple virtual sub-pixels (e.g., sub-pixels 904), and a uniformity map calibration may be performed over the virtual sub-pixels. In various embodiments, each pixel, due to the variance in physical properties of detector materials (e.g., semiconductor material such as CZT), may include inhomogeneous regions distributed throughout the pixel. Each pixel may be divided into virtual sub-pixels included along or across the inhomogeneous regions to address the non-uniformity within the physical pixels.

In some embodiments, calibration (e.g., sensitivity calibration) may be performed for each virtual sub-pixel. With calibration parameters determined for each virtual sub-pixel, received events may then be adjusted using the calibration parameters for each virtual sub-pixel to provide calibrated signals. Then, for each physical pixel, received events (e.g., events within a predetermined energy window) may be summed from the calibrated virtual sub-pixels to provide a calibrated number of events for the physical pixel. Generally, the more sub-pixels used per pixel, the more uniform results may be obtained, but there will be more processing requirements for relatively larger numbers of sub-pixels.

Figure 12:
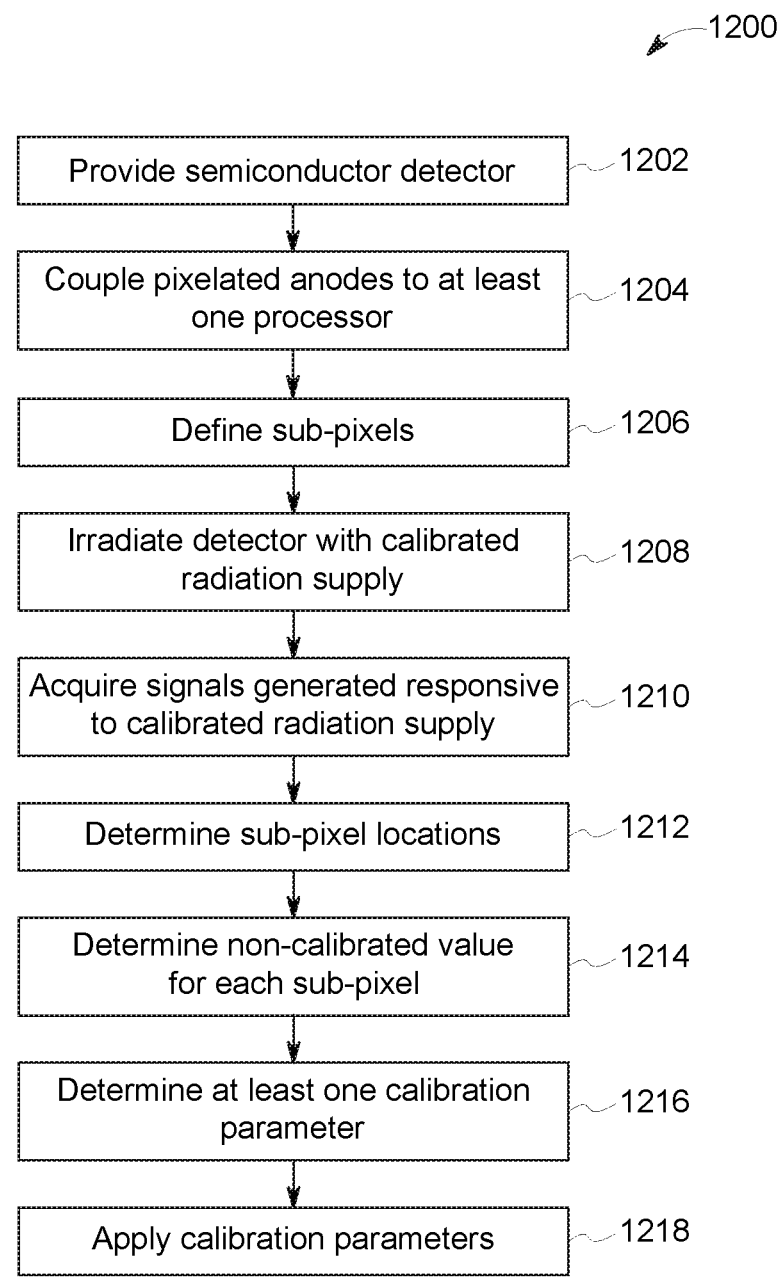
FIG. 12 shows a flowchart of a method, according to an embodiment.

FIG. 12 provides a flowchart of a method 1200 for calibrating a detector or detector system (e.g., on a per sub-pixel basis), in accordance with various embodiments. The method 1200, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1200 may be able to be used as one or more algorithms to direct hardware (e.g., one or more aspects of the processing unit 120) to perform one or more operations described herein.

At 1202, a semiconductor detector (e.g., semiconductor detector 110 of FIG. 1, semiconductor 900 of FIG. 10) is provided. Generally, the semiconductor detector for the illustrated embodiment includes a reception surface configured to receive radiation (e.g., photons). A grid, matrix, or array of pixels (with corresponding pixelated anodes) are disposed on the reception surface, with each pixelated anode configured to produce signals that are identifiable as being originated from the particular pixelated anode (e.g., having an address or other identifier associated therewith). In some embodiments, the anodes (and/or associated processing circuitry) generate primary signals responsive to impact of a photon within the pixel itself, and secondary signals responsive to induced charges on neighboring or adjacent pixels induced by impact of photons within other adjacent or neighboring pixels where the primary signals are generated as discussed herein.

At 1204, the pixelated anodes of the detector are coupled to at least one processor (e.g., processing unit 120). All or a portion of the at least one processor may be housed separately from the detector and/or disposed onboard, such as but not limited to an ASIC, or otherwise integrated with the detector. The at least one processor may include or have associated therewith processing circuitry corresponding to electronic channels, with each channel assigned to a particular pixelated anode. Each channel may include, for example, a Peak & Hold (P&H) unit and threshold discriminator circuitry configured to prevent or inhibit transmission of signals that are not as strong as the secondary signals. In some embodiments, each channel may also associate timing and location (e.g., pixel address) information with each signal transmitted via the channel.

At 1206, sub-pixels are defined. For example, the at least one processor in various embodiments defines sub-pixels (e.g., sub-pixels 904) for each pixelated anode and derives or defines the sub-pixel locations (sub-pixel addresses) for the pixelated anode or within the corresponding pixel. As discussed herein, the sub-pixels are virtual sub-pixels defined by the at least one processor, and are not physically separated or distinct in the depicted embodiment. It may be noted that in some embodiments, the sub-pixels may be uniform in size and symmetrically distributed (e.g., as shown in FIG. 11). It may be noted that in other embodiments the sub-pixels may not be uniform in size and/or may be non-symmetrically distributed along the pixel.

At 1208, with sub-pixels defined and the at least one processor operably coupled to the detector, the detector (e.g., the reception surface of the detector including the pixelated anodes) is irradiated with a calibrated or known radiation supply. The radiation supply may include radiation from one or more isotopes having known or expected corresponding energy distributions (e.g., detector counts distributed across a range of energy levels). The calibrated radiation supply, for example, may be provided uniformly to all pixels of the detector, or may be provided individually for each pixel (or sub-pixel). Generally, the radiation supply is configured to provide radiation that will impact each sub-pixel of each pixel during a calibration process.

At 1210, signals generated by the pixelated anodes responsive to the calibrated radiation supply are acquired by the at least one processor. For example, the signals in various embodiments include primary signals and secondary signals as discussed herein. Each primary and secondary signal may have associated therewith location information (identifying the particular pixel for which the signal was generated) and timing information (identifying a time corresponding to the generation of the signal).

At 1212, sub-pixel locations are determined for calibrated acquisition events (e.g., acquisition events resulting from the use of a calibrated or known radiation supply) using the signals generated responsive to the calibrated radiation supply (e.g., the signals acquired at 1210). For example, for each acquisition event resulting in a primary signal, the pixel location may be identified by the associated location information, and the sub-pixel location may be determined based on primary and secondary signals using corresponding induced charges for the acquisition event (e.g., as determined using timing information and location information).

At 1214, a non-calibrated value (or values) for each sub-pixel is determined (e.g., using the signals generated responsive to the calibrated acquisition events). For example, the non-calibrated value may include a total count of acquired events over a predetermined time period for each sub-pixel. In some embodiments, spectra may be acquired, with acquired events binned into groups corresponding to the virtual sub-pixels (e.g., as a histogram). An energy spectrum may then be constructed for each sub-pixel, with each energy spectrum used to perform calibration for the corresponding sub-pixel.

At 1216, at least one calibration parameter is determined. The at least one calibration parameter is determined to adjust the non-calibrated value for each sub-pixel (e.g., the non-calibrated value or values determined at 1214) to a desired value. In some embodiments, the desired value is an expected value. For example, the ratio between a non-calibrated value of counts per sub-pixel over a predetermined or known amount of time, and a known or expected number of counts per sub-pixel over the same amount of time may be used to determine an appropriate calibration parameter that, when applied, will adjust the non-calibrated value to the adjusted value. For example, for sub-pixels that have a lower non-calibrated value than expected, a calibration parameter may be determined to adjust the value higher. Similarly, for sub-pixels that have a higher non-calibrated value than expected, a calibration parameter may be determined to adjust the value lower. The magnitude of the calibration parameter for a given sub-pixel may be selected based on the magnitude of the ratio between the non-calibrated value for the sub-pixel and the desired value. Generally, to determine the calibration parameters for any given sub-pixel, a value or values (e.g., an individual measurement, or a spectra measurement) is compared to the desired, expected, or known measurement, and the calibration parameters are determined to align or match the sub-pixel measurements with the desired, known, or expected measurements.

It may be noted that, in some embodiments, the at least one calibration parameter includes a sensitivity calibration parameter. Further, in some embodiments, the at least one calibration parameter includes a sub-pixel count parameter for each sub-pixel, with the method 1200 including adjusting a total number of non-calibrated counts for acquisition events for each sub-pixel using the corresponding sub-pixel count parameter.

At 1218 of the illustrated embodiment, the determined calibration parameters are applied to the non-calibrated values determined at 1214 for each sub-pixel to generate or provide a calibrated, adjusted, or aligned value (or values) for each sub-pixel. In some embodiments, the application of the determined calibration parameters includes applying a uniformity map calibration to the acquired signals.

Figure 13:
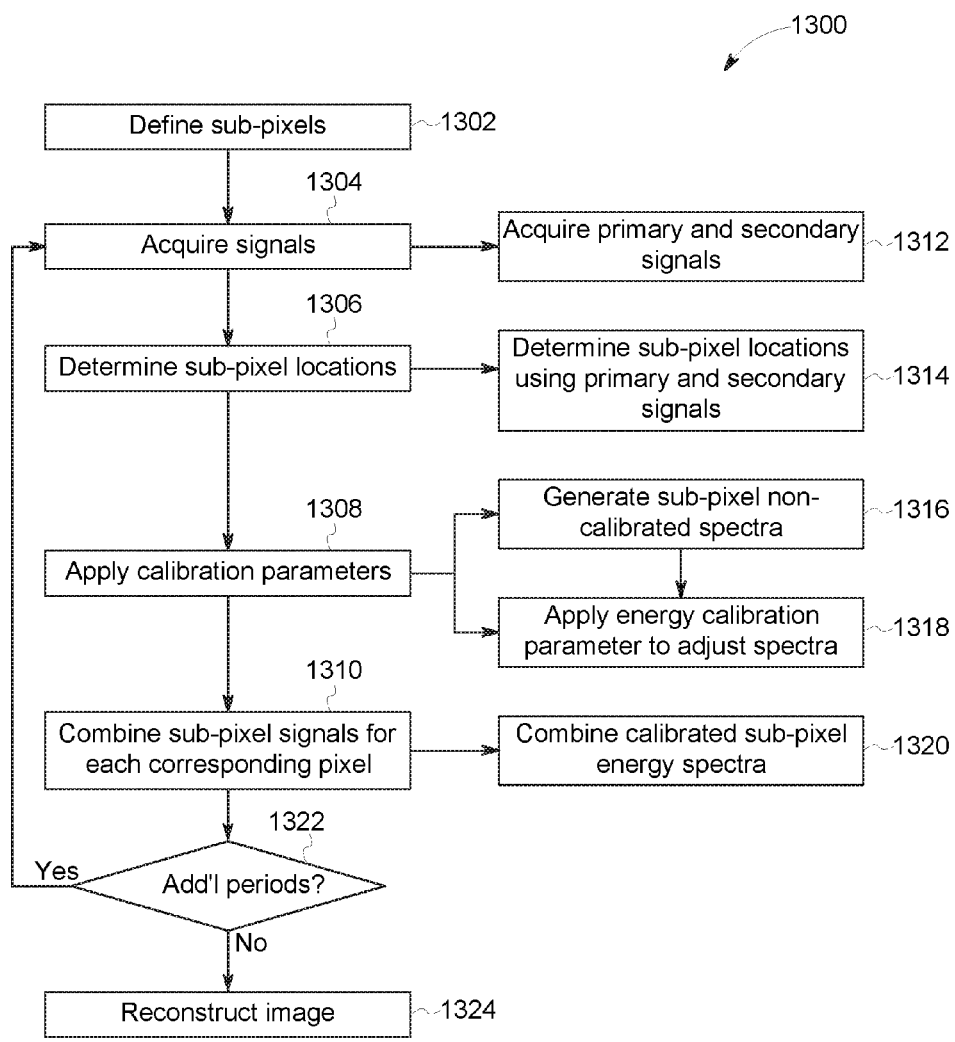
FIG. 13 shows a flowchart of a method, according to an embodiment.

FIG. 13 provides a flowchart of a method 1300 for radiation detection, in accordance with various embodiments. The method 1300 may be utilized, for example, in connection with nuclear medicine imaging to detect radiation emitted from a patient or other object to be imaged. The method 1300, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1300 may be able to be used as one or more algorithms to direct hardware (e.g., one or more aspects of the processing unit 120) to perform one or more operations described herein.

At 1302, sub-pixels are defined (e.g., by at least one processor such as processing unit 120 of FIG. 1) for each pixelated anode (e.g., pixelated anode 114, pixelated anode 920) of a detector (e.g., semiconductor detector 110, semiconductor detector 900). In various embodiments, there is a corresponding pixel for each pixelated anode, and the sub-pixels may additionally or alternatively be understood as being defined for each pixel. In various embodiments, the sub-pixels are virtual (in contrast to physical) sub-divisions of the various pixelated anodes constructed or defined by a processor.

At 1304, signals corresponding to acquisition events from the pixelated anodes are acquired. For example, a patient that has been administered at least one radiopharmaceutical may be placed within a field of view of one or more detectors, and radiation (e.g., photons) emitted from the patient may impact the pixelated anodes disposed on reception surfaces of the one or more detectors resulting in acquisition events (e.g., photon impacts). In some embodiments, the signals may include more than one type of signal. For example, in the illustrated embodiment, at 1312, primary signals and secondary signals as discussed herein are acquired corresponding to acquisition events from the pixelated anodes. Photon impacts in the illustrated embodiment result in a primary signal generated by the impacted pixelated anode and secondary signals generated by pixelated anodes adjacent to the impacted pixelated anode.

At 1306, sub-pixel locations are determined for the acquisition events using the signals acquired at 1304. In the illustrated embodiment, at 1314, the sub-pixel locations are determined using the acquired primary and secondary signals. For example, as discussed herein, the pixel location for a given acquisition event may be determined by the location associated with the primary signal, and the sub-pixel location may be determined using corresponding secondary signals of adjacent pixels associated with the primary signal (e.g., associated by proximity in time).

At 1308, one or more calibration parameters (e.g., parameters determined for each virtual sub-pixel as discussed in connection with FIG. 12) are applied to signals for each sub-pixel based on the determined sub-pixel locations to provide calibrated signals (e.g., signals that have been adjusted to account for, address, and/or reduce the effects of inhomogeneous regions occurring within pixels). The calibration parameters are applied on a per sub-pixel basis as discussed herein. In the illustrated embodiment, each sub-pixel has one or more independently determined or assigned calibration parameters, with signals identified for each particular sub-pixel adjusted by the corresponding calibration parameter(s) for that particular sub-pixel. In various embodiments, a calibration parameter (or set of parameters) may be predetermined and stored for each sub-pixel. Then, the calibration parameters are retrieved based on a determined sub-pixel location for a given signal or signals.

It may be noted that the calibration parameters may be applied to spectra. For example, in the illustrated embodiment, at 1316, a sub-pixel non-calibrated energy spectrum for the radiation emitted by the radiopharmaceutical is generated using the primary signals. For example, as discussed herein, primary signals for each sub-pixel may be binned based on energy level to provide a non-calibrated histogram of counts per energy level to generate an individual non-calibrated energy spectrum for each sub-pixel. Each individual non-calibrated energy spectrum, based on the sub-pixel location of the spectra, will form calibrated spectra for each sub-pixel. At 1318, at least one energy calibration parameter is applied to adjust the sub-pixel energy spectra for each pixelated anode to produce calibrated sub-pixel energy spectra (e.g., as discussed in connection with FIG. 8).

At 1310, the sub-pixel signals are combined for the corresponding pixels (or pixelated anodes). In the illustrated embodiment, the sub-pixel adjustment parameters are applied before combining sub-pixel signals for each pixel or pixelated anode. In the illustrated embodiment, at 1320, the calibrated sub-pixel energy spectra are combined to provide a pixelated anode spectrum.

At 1322, it is determined if additional collection periods are to be performed. For example, after each collection period, the readouts of electronics associated with the pixelated anodes may be blanked or re-set to detect additional acquisition events occurring at a subsequent time. The imaging information acquired during a particular scan may be acquired over a number of individual collection periods, with the information for all of the collection periods used to reconstruct an image. If additional collection periods are to be performed, the readouts for the various channels associated with the pixelated anodes may be blanked or re-set, and the method 1300 returns to 1304 for acquisition of signals for the new collection period. If no additional collection periods are to be performed, the depicted method proceeds to 1324, at which imaging information acquired and/or generated during the scan is used to reconstruct an image of the object that was scanned.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

As used herein, the term "computer," "processor," or "module" may include any processor-based or microprocessor-based system including systems using microcontrollers, reduced instruction set computers (RISC), application specific integrated circuits (ASICs), field programmable gate arrays (FPGA's), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A radiation detector assembly comprising:
   a semiconductor detector having a surface;
   plural pixelated anodes disposed on the surface, the pixelated anodes configured to generate primary signals responsive to reception of photons by the pixelated anodes and to generate secondary signals responsive to induced charges caused by reception of photons by at least one adjacent anode; and
   at least one processor operably coupled to the pixelated anodes, the at least one processor configured to:
   define sub-pixels for each pixelated anode, the sub-pixels defined using a predetermined grid defined across the surface, the predetermined grid defined independently of a depth of interaction of acquired events;

acquire signals comprising the primary signals and the secondary signals corresponding to acquisition events from the pixelated anodes;

determine sub-pixel locations for the acquisition events using the signals; and apply at least one calibration parameter on a per sub-pixel basis for the acquisition events based on the determined sub-pixel locations.

2. The radiation detector assembly of claim 1, wherein the at least one calibration parameter comprises a sub-pixel adjustment parameter for each sub-pixel that is independently determined for each sub-pixel.

3. The radiation detector assembly of claim 1, wherein the at least one processor is configured to apply the sub-pixel adjustment parameter to each sub-pixel before combining sub-pixel signals for corresponding pixels.

4. The radiation detector assembly of claim 1, wherein the at least one calibration parameter comprises a sensitivity calibration parameter.

5. The radiation detector assembly of claim 1, wherein the at least one calibration parameter comprises a sub-pixel count parameter for each sub-pixel, wherein the at least one processor is configured to adjust a total number of counts for acquisition events for each sub-pixel using the corresponding sub-pixel count parameter.

6. The radiation detector assembly of claim 1, wherein the at least one processor is configured to apply a uniformity map calibration to the signals.

7. The radiation detector assembly of claim 1, wherein the at least one calibration parameter comprises at least one energy calibration parameter, and wherein at least one processor is configured to:

generate a sub-pixel energy spectrum for each sub-pixel, using the primary signals, to produce sub-pixel energy spectra;

apply at least one energy calibration parameter to adjust the sub-pixel energy spectra for each pixelated anode to produce calibrated sub-pixel energy spectra; and for each pixelated anode, combine the calibrated sub-pixel energy spectra to provide a pixelated anode spectrum.

8. The detector assembly of claim 7, wherein the at least one processor is configured to align respective peaks of the sub-pixel energy spectra for each pixelated anode using the at least one energy calibration parameter.

9. The detector assembly of claim 7, wherein the at least one energy calibration parameter is selected from a group of parameters comprising a gain and an offset, wherein applying the gain adjusts a position and a breadth of a peak of an energy spectrum being adjusted and applying the offset shifts a peak location of the spectrum being adjusted.

10. A method of imaging using a semiconductor detector having a surface with plural pixelated anodes disposed thereon, the pixelated anodes configured to generate primary signals responsive to reception of photons by the pixelated anodes and to generate secondary signals responsive to an induced charges caused by reception of photons by at least one adjacent anodes the method comprising:

defining, with at least one processor operably coupled to the pixelated anodes, sub-pixels for each pixelated anode, the sub-pixels defined using a predetermined grid defined across the surface, the predetermined grid defined independently of a depth of interaction of acquired events;

acquiring, with the at least one processor, signals comprising the primary and secondary signals corresponding to acquisition events from the pixelated anodes;

determining, with the at least one processor, sub-pixel locations for the acquisition events using the signals; and applying, with the at least one processor, at least one calibration parameter on a per-sub-pixel bases for the acquisition events based on the determined sub-pixel locations.

11. The method of claim 10, wherein the at least one calibration parameter comprises a sub-pixel adjustment parameter for each sub-pixel that is independently determined for each sub-pixel.

12. The method of claim 10, further comprising applying the sub-pixel adjustment parameter to each sub-pixel before combining sub-pixel signals for corresponding pixels.

13. The method of claim 10, wherein the at least one calibration parameter comprises a sensitivity calibration parameter.

14. The method of claim 10, wherein the at least one calibration parameter comprises a sub-pixel count parameter for each sub-pixel, wherein the method further comprises adjusting a total number of counts for acquisition events for each sub-pixel using the corresponding sub-pixel count parameter.

15. The method of claim 10, further comprising applying a uniformity map calibration to the signals.

16. The method of claim 10, wherein the at least one calibration parameter comprises at least one energy calibration parameter, the method further comprising:

generating a sub-pixel energy spectrum for each sub-pixel, using the primary signals, to produce sub-pixel energy spectra;

applying at least one energy calibration parameter to adjust the sub-pixel energy spectra for each pixelated anode to produce calibrated sub-pixel energy spectra; and for each pixelated anode, combining the calibrated sub-pixel energy spectra to provide a pixelated anode spectrum.

17. A method of providing a radiation detector assembly comprising:

providing a semiconductor detector having a surface with plural pixelated anodes disposed thereon, the pixelated anodes configured to generate primary signals responsive to reception of photons by the pixelated anodes and to generate secondary signals responsive to induced charges caused by reception of photons by at least one adjacent anode;

operably coupling the pixelated anodes to at least one processor;

defining, with the at least one processor, sub-pixels for each pixelated anode, the sub-pixels defined using a predetermined grid defined across the surface, the predetermined grid defined independently of a depth of interaction of acquired events;

providing a calibrated radiation supply to the semiconductor detector, wherein the pixelated anodes generate calibrated signals comprising calibrated primary signals and calibrated secondary signals responsive to the calibrated radiation supply;

acquiring, with the at least one processor, the calibrated signals from the pixelated anodes;

determining sub-pixel locations for calibration acquisition events using the calibrated signals generated responsive to the calibrated radiation supply;

determining a non-calibrated value for each sub-pixel;

determining at least one calibration parameter to adjust the non-calibrated value for each sub-pixel to a desired value; and applying the at least one determined calibration parameter to the non-calibrated value for each sub-pixel to generate a calibrated value for each sub-pixel.

18. The method of claim 17, wherein the at least one calibration parameter comprises a sensitivity calibration parameter.

19. The method of claim 17, wherein the at least one calibration parameter comprises a sub-pixel count parameter for each sub-pixel, wherein the method further comprises adjusting a total number of non-calibrated counts for acquisition events for each sub-pixel using the corresponding sub-pixel count parameter.

20. The method of claim 17, further comprising applying a uniformity map calibration to the signals.

* * * * *